(12) United States Patent
Rhee et al.

(10) Patent No.: US 9,165,132 B2
(45) Date of Patent: Oct. 20, 2015

(54) METHOD OF AUTHENTICATING PASSWORD AND PORTABLE DEVICE THEREOF

(71) Applicant: SAMSUNG ELECTRONICS CO., LTD., Suwon-si (KR)

(72) Inventors: Jong-ho Rhee, Seoul (KR); Sang-heun Oh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 199 days.

(21) Appl. No.: 13/680,242

(22) Filed: Nov. 19, 2012

(65) Prior Publication Data

US 2013/0139248 A1    May 30, 2013

(30) Foreign Application Priority Data

Nov. 28, 2011  (KR) .................. 10-2011-0125425

(51) Int. Cl.
```
G06F 7/04        (2006.01)
G06F 21/36       (2013.01)
G06F 3/0488      (2013.01)
G06F 3/0346      (2013.01)
H04L 29/06       (2006.01)
G06F 12/14       (2006.01)
```

(52) U.S. Cl.
CPC .............. G06F 21/36 (2013.01); G06F 3/0346 (2013.01); G06F 3/04883 (2013.01)

(58) Field of Classification Search
CPC ..... G06F 21/36; H04L 63/083; H04L 9/3226; H04W 12/06
See application file for complete search history.

(56) References Cited

U.S. PATENT DOCUMENTS

| | | | |
|---|---|---|---|
| 5,764,770 A * | 6/1998 | Schipper et al. | 713/176 |
| 5,815,083 A * | 9/1998 | Patarin et al. | 340/5.27 |
| 7,240,367 B2 * | 7/2007 | Park | 726/18 |
| 8,117,458 B2 * | 2/2012 | Osborn et al. | 713/183 |
| 2001/0005887 A1 * | 6/2001 | Boroditsky et al. | 713/183 |
| 2001/0047488 A1 | 11/2001 | Verplaetse et al. | |
| 2003/0177349 A1 * | 9/2003 | Hersh | 713/155 |

(Continued)

FOREIGN PATENT DOCUMENTS

| | | |
|---|---|---|
| DE | 102009052174 B3 | 10/2010 |
| EP | 1768047 A2 | 3/2007 |

(Continued)

OTHER PUBLICATIONS

Communication dated Apr. 2, 2013 from the European Patent Office in counterpart European application No. 12193975.5.

(Continued)

*Primary Examiner* — Dede Zecher
*Assistant Examiner* — Trang Doan
(74) *Attorney, Agent, or Firm* — Sughrue Mion, PLLC

(57) ABSTRACT

A method of authenticating a password and a portable device thereof are provided. The method includes: displaying an input keyboard on which a plurality of objects are arranged; changing an object arranged on the input keyboard according to a manipulation of a user; and if an object pattern arranged in a designated position of the input keyboard corresponds to a preset password pattern, authenticating the user. Therefore, it is difficult to use artifacts on the display screen to trace a password after entry, and thus security is improved. As a result, a protection of personal information of a user is strengthened.

23 Claims, 22 Drawing Sheets

(56) References Cited

U.S. PATENT DOCUMENTS

| | | | |
|---|---|---|---|
| 2004/0243855 A1* | 12/2004 | Plagne | 713/202 |
| 2005/0162407 A1* | 7/2005 | Sakurai et al. | 345/173 |
| 2007/0016792 A1* | 1/2007 | Allen et al. | 713/182 |
| 2007/0157299 A1* | 7/2007 | Hare | 726/9 |
| 2008/0141362 A1 | 6/2008 | Torres et al. | |
| 2009/0037742 A1* | 2/2009 | Narayanaswami | 713/186 |
| 2009/0083847 A1* | 3/2009 | Fadell et al. | 726/16 |
| 2009/0083850 A1* | 3/2009 | Fadell et al. | 726/19 |
| 2009/0094689 A1* | 4/2009 | Gargaro et al. | 726/7 |
| 2010/0222095 A1 | 9/2010 | Yamashita et al. | |
| 2011/0004769 A1 | 1/2011 | Won et al. | |
| 2011/0090145 A1* | 4/2011 | Lu | 345/156 |
| 2011/0162066 A1* | 6/2011 | Kim et al. | 726/18 |
| 2011/0246951 A1* | 10/2011 | Chen | 715/863 |
| 2011/0316888 A1* | 12/2011 | Sachs et al. | 345/667 |
| 2012/0272311 A1 | 10/2012 | Althammer et al. | |

FOREIGN PATENT DOCUMENTS

| | | | |
|---|---|---|---|
| GB | 2471142 A | 12/2010 | |
| JP | 2003067341 A | 3/2003 | |
| KR | 1020050119954 A | 12/2005 | |
| KR | 1020060031506 A | 4/2006 | |
| KR | 1020070044916 A | 5/2007 | |
| KR | 1020080062604 A | 7/2008 | |
| KR | 1020080097397 A | 11/2008 | |
| KR | 1020100102018 A | 9/2010 | |
| KR | 101045257 B1 | 6/2011 | |
| KR | 1020110076234 A | 7/2011 | |
| WO | 2006036069 A1 | 4/2006 | |
| WO | 2009017751 A1 | 2/2009 | |
| WO | 2011054337 A1 | 5/2011 | |

OTHER PUBLICATIONS

Communication Oct. 28, 2013 issued by the European Patent Office in counterpart European Patent Application No. 12193975.5.

Bogdan Hoanca et al., "A Theoretical Framework for Assessing Eavesdropping-Resistant Authentication Interfaces," Proceedings of the 42nd Hawaii International Conference on System Sciences, Jan. 5 2009, pp. 1 to 10.

* cited by examiner

METHOD OF AUTHENTICATING PASSWORD AND PORTABLE DEVICE THEREOF

CROSS-REFERENCE TO RELATED APPLICATION

This application claims priority from Korean Patent Application No. 10-2011-0125425, filed on Nov. 28, 2011, in the Korean Intellectual Property Office, the disclosure of which is incorporated herein by reference in its entirety.

BACKGROUND

1. Field

Apparatuses consistent with exemplary embodiments relate to a method of authenticating a password and a portable device thereof, and more particularly, to a method of authenticating a password of a portable device including a screen which may be a touch screen and the portable device thereof.

2. Description of the Related Art

The development of personal portable devices that are capable of participating in e-commerce, and of implementing the full range of financial transactions, has brought with it a heightened level of concern for the protection of the user's personal information accessible on and via such devices. One main approach to realizing protection for personal portable devices has been the setting and authentication of a password.

More specifically, known approaches to authenticating a user include inputting preset numbers, or drawing a figure in a preset pattern. However, these known approaches, i.e., the use of an ordered sequence of numbers or the use of an input pattern, are susceptible to compromise by malefactors who may, unbeknownst to the user, covertly observe how the user inputs the password; that is, by "shoulder-surfing", another might view the pattern entered by the user, or the position of the user's fingers when completing authentication, even without necessarily being able to observe the user's display. This is because, on a typical display, button arrangements are fixed, and so another person can estimate and often reproduce the manner in which the user entered an authentication sequence or pattern. This fact may result in exposure or compromise of the user's authentication sequence or pattern, thereby jeopardizing the safety of the user's personal information.

Touch screens, which are especially prolific in modern personal portable devices, also offer the risk that oils or other matter may be left behind when a user enters an authentication sequence or pattern. In other words, touch screens are susceptible to compromise through traces left behind from the user's fingertips. Such trace information may enable another person to estimate or reproduce the user's authentication sequence or pattern.

Accordingly, a more powerful, secure method of authenticating a password, and thus authenticating a user is needed.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a method of authenticating a password, by which a complexity of a password can be increased to further reinforce a protection of personal information, and a portable device thereof.

According to an aspect of an exemplary embodiment, there is provided a method of authenticating a password of a portable device comprising a touch screen. The method may include: displaying an input keyboard on which a plurality of objects are arranged; changing arrangements of at least some of the plurality of objects or changing at least one of the plurality of objects to another one according to a manipulation of a user; and if a pattern formed by an object arranged in a designated position of the input keyboard corresponds to a preset password pattern, authenticating the user.

The change of the arrangements of the at least some of the plurality of objects or the change of the at least one of the plurality of objects to the another one may include: if a first object arranged on the input keyboard is touched to be dragged into a position in which a second object of the input keyboard is displayed, changing positions of the first and second objects with each other.

The change of the arrangements of the at least some of the plurality of objects or the change of the at least one of the plurality of objects to the another one may include: if a first object arranged on the input keyboard is touched, and a second object arranged on the input keyboard is touched, changing positions of the first and second objects with each other.

The input keyboard may be displayed in a matrix. The change of the arrangements of the at least some of the plurality of objects or the change of the at least one of the plurality of objects to the another one may include: if a first object arranged on the input keyboard is touched, and upward and downward motions of the portable device are sensed, scrolling and changing a column comprising the first object; and if the first object is touched, and left and right motions of the portable device are sensed, scrolling and changing a line comprising the first object.

The input keyboard may be displayed in a matrix. The change of the arrangements of at least some of the plurality of objects or the change of the at least one of the plurality of objects to the another one may include: if a first object arranged on the input keyboard is touched to be dragged upwards and downwards, scrolling and changing a column comprising the first object; and if the first object is touched to be dragged in left and right directions, scrolling and changing a line comprising the first object.

The objects displayed on the input keyboard may be numbers. The change of the arrangements of the at least some of the plurality of objects or the change of the at least one of the plurality of objects to the another one may include: touching and selecting a first number arranged on the input keyboard; if the portable device is inclined, selecting one of four fundamental operations corresponding to a preset direction in which the portable device is inclined; touching and selecting a second number arranged on the input keyboard; and calculating the first and second numbers by using one of the four fundamental operations corresponding to the preset direction to change the first number according to the calculation result.

If the calculation result of the first and second numbers by using one of the four fundamental operation corresponding to the preset direction is greater than or equal to 10, the first number may be changed to a one-digit number of the calculation result.

If the objects arranged on the input keyboard are numbers, the plurality of numbers may be randomly arranged and displayed on the input keyboard.

The designated position may be displayed to be distinguished from undesignated positions of the input keyboard According to an aspect of another exemplary embodiment, there is provided a portable device for authenticating a password. The portable device may include: a touch screen which displays an input keyboard on which a plurality of objects are arranged; and a controller which changes arrangements of at least some of the plurality of objects arranged on the input keyboard or changing at least one of the plurality of objects to another one according to a manipulation of a user, and if a pattern formed by an object arranged in a designated position of the input keyboard corresponds to a preset password pattern, authenticates the user If a first object arranged on the input keyboard is touched to be dragged into a position in which a second object of the input keyboard is displayed, the controller may change positions of the first and second objects with each other.

If a first object arranged on the input keyboard is touched, and a second object arranged on the input keyboard is touched, the controller may change positions of the first and second objects.

The touch screen may display the input keyboard in a matrix. If a first object arranged on the input keyboard, and upward and downward motions of the portable device are sensed, the controller may scroll and change a column including the first object, and if left and right motions of the portable device are sensed, the controller may scroll and change a line including the first object.

The touch screen may display the input keyboard in a matrix. If a first object arranged on the input keyboard is touched to be dragged upwards and downwards, the controller may scroll and change a column including the first object, and if the first object is touched to be dragged in left and right directions, the controller may scroll and change a line including the first object.

The objects arranged on the input keyboard may be numbers. The controller may touch and select a first number arranged on the input keyboard, select one of four fundamental operations corresponding to a preset direction in which the portable device is inclined, touch and select a second number arranged on the input keyboard, and calculate the first and second numbers by using one of the four fundamental operations corresponding to the preset direction to change the first number according to the calculation result.

If the calculation result of the first and second numbers by using one of the four fundamental operation corresponding to the preset direction is greater than or equal to 10, the controller may change the first number to a one-digit number of the calculation result.

If the objects displayed on the input keyboard are numbers, the touch screen may randomly arrange and display the plurality of numbers on the input keyboard.

The designated position may be displayed to be distinguished from undesignated positions of the input keyboard.

The portable device may further include: a communicator which communicates with an external server. The controller may control the communicator to transmit information about an object pattern arranged in the designated position to the external server.

According to an aspect of another exemplary embodiment, there is provided a method of authenticating a password of a portable device comprising a touch screen. The method may include: displaying an input keyboard on which a plurality of objects are arranged; and if at least one of the plurality of objects is touched to be dragged, comparing the touched object and a dragged direction of the touched object with a preset password to authenticate a user. The preset password may include a type of a selected object and a dragged direction of the corresponding object.

According to an aspect of another exemplary embodiment, there is provided a portable device for authenticating a password. The portable device may include: a touch screen which displays an input keyboard on which a plurality of objects are arranged; and a controller which, if at least one of the plurality of objects is touched to be dragged, compares the touched object and the dragged direction of the touched object with a preset password to authenticate a user. The preset password may include a type of a selected object and a dragged direction of the corresponding object.

According to an aspect of another exemplary embodiment, there is provided a method of authenticating a password of a portable device comprising a touch screen. The method may include: displaying an object and a timer on the touch screen; if the object is touched, counting a time taken until the touch of the object is released and displaying the counted time on the timer; and if the object is touched a preset number of times, combining times counted at all touches and comparing the combination result with a preset password to authenticate a user.

The input keyboard on which a plurality of numbers are arranged may be displayed on the touch screen. If one of the plurality of numbers is selected, the counting may start from a time corresponding to the selected number to display the counted time on the timer.

The method may further include: vibrating the portable device at each preset time when the object is being touched to count the time.

If the touch of the object continues for a preset threshold time or more, a speed of the counting may be accelerated.

According to an aspect of another exemplary embodiment, there is provided a portable device for authenticating a password. The portable device may include: a touch screen which displays an object and a timer; and a controller which, if the object is touched, counts a time taken until the touch of the object is released to display the counted time on the timer, if the object is touched a preset number of times, combines times counted at all touches, and compares the combination result with a preset password to authenticate a user.

The touch screen may display the input keyboard on which a plurality of numbers are arranged. If one of the plurality of numbers is selected, the controller may start the counting from a time corresponding to the selected number to display the counted time on the timer.

The portable device may further include: a vibration motor which vibrates the portable device. The controller may control the vibration motor to vibrate the portable device at each preset time when the object is being touched to count the time.

If the touch of the object continues for a preset threshold time or more, the controller may accelerate a speed of the counting.

According to an aspect of another exemplary embodiment, there is provided a method of authenticating a password of a portable device comprising a touch screen. The method may include: displaying an input keyboard on which a plurality of objects are arranged and a digital compass; sensing a direction of the portable device; displaying the sensed direction of the portable device on the digital compass; and if at least one object is touched on the input keyboard, and the touched object and a direction of the portable device correspond to a preset password, authenticating a user.

According to an aspect of another exemplary embodiment, there is provided a portable device for authenticating a password. The portable device may include: a sensor which senses a direction of the portable device; a touch screen which displays an input keyboard on which a plurality of objects are arranged and a digital compass; and a controller which displays the direction of the portable device sensed by the sensor on the digital compass, and if at least one object is touched on the input keyboard, and the touched object and the direction of the portable device correspond to a preset password, authenticates a user.

According to an aspect of another exemplary embodiment, there is provided a method of authenticating a password of a portable device comprising a touch screen. The method may include: displaying an input keyboard on which a plurality of objects are arranged; and if a touch of at least one of the plurality of objects and a motion of the portable device at a touch time of the at least one object are sensed, and the touched object and the motion of the portable device at the touch time of the at least one object correspond to a preset password, authenticating a user.

According to an aspect of another exemplary embodiment, there is provided a portable device for authenticating a password. The portable device may include: a sensor which senses a motion of the portable device; a touch screen which displays an input keyboard on which a plurality of objects are arranged; and a controller which, if a touch of at least one of the plurality of objects and a motion of the portable device at a touch time of the at least one object are sensed, and the touched object and the motion of the portable device at the touch time of the at least one object correspond to a preset password, authenticates a user.

According to an aspect of another exemplary embodiment, there is provided an authentication method for a device which includes, on a display of the device, displaying a plurality of authentication interaction symbols in an arrangement; in response to an input signal, modifying the arrangement of the symbols to display a subsequent arrangement of the symbols; when the subsequent arrangement of the symbols matches a previously set authentication arrangement, determining the device to have an authenticated state.

The input signal may be generated in response to a movement of one of the symbols from one position to another position. The movement may be indicated by a dragging operation.

The input signal may be generated in response to a selection of two of the symbols.

The input signal may be generated in response to a selection of one of the symbols and a physical motion of the device. The physical motion may indicate a direction of movement for a selected one of the plurality of authentication interaction symbols. The symbols may include numbers; and the physical motion may indicate a mathematical operation to be performed with respect to the number for the selected one of the symbols; the calculation result of the mathematical operation may be used in the modifying of the arrangement of the symbols to display the subsequent arrangement of the symbols. The calculation result may be based also on the number for a second selected one of the symbols.

According to an aspect of another exemplary embodiment, there is provided an authentication method for a device includes, on a display of the device, displaying a plurality of authentication interaction symbols in a random arrangement; detecting one or more input signals, with respect to one or more selected ones of the plurality of authentication interaction symbols, and also respective direction information for the one or more input signals, to obtain a sequence of selected symbol indications with respective direction information; and when the sequence of selected symbol indications with respective direction information matches a previously set authentication sequence, determining the device to have an authenticated state.

The plurality of authentication interaction symbols may be rearranged in a subsequent random arrangement after the detection of one of the one or more input signals.

The respective direction information for the one or more input signals may indicate a stroke direction at the time of symbol selection.

The respective direction information for the one or more input signals may indicate a physical orientation of the device at the time of symbol selection.

The respective direction information for the one or more input signals may indicate a physical motion of the device at the time of symbol selection.

In another exemplary embodiment, an authentication method for a device includes, on a display of the device, displaying one or more authentication interaction symbols; detecting one or more input signals, with respect to the one or more authentication interaction symbols, and also a respective timing of input for the one or more input signals, to obtain a sequence of signal input timing values; when the sequence of signal input timing values matches a previously set authentication sequence, determining the device to have an authenticated state.

Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF THE EXEMPLARY EMBODIMENTS

Figure 1:
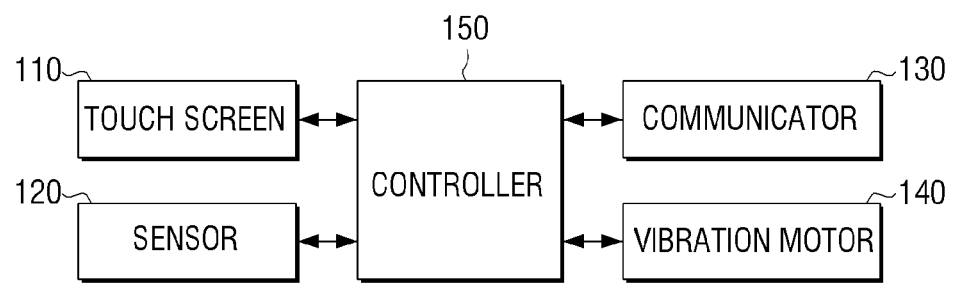
FIG. 1 is a block diagram illustrating a structure of a portable device according to an exemplary embodiment.

Hereinafter, exemplary embodiments will be described in greater detail with reference to the accompanying drawings.

In the following description, the same reference numerals are used for the same elements when they are depicted in different drawings. The matters mentioned in the description, such as detailed construction and elements, are provided to assist in a comprehensive understanding of the exemplary embodiments. Thus, it is apparent that the exemplary embodiments can be carried out without those specifically defined matters. In other words, the details are provided for the sake of explanation, but not limitation. Also, functions or elements known in the related art are not described in detail since they would obscure the exemplary embodiments with unnecessary detail.

FIG. 1 is a block diagram illustrating a structure of a portable device 100 according to an exemplary embodiment. Referring to FIG. 1, the portable device 100 includes a touch screen 110, a sensor 120, a communicator 130, a vibration motor 140, and a controller 150. The portable device 100 may be realized as a device, such as a cellular phone, a personal digital assistant (PDA), a tablet personal computer (PC), a television (TV) remote controller, a portable medical device, etc., but is not limited thereto. Although the following discussion is usually in the context of a device with a touch screen, persons familiar with this field of endeavor will realize that some of the exemplary embodiments below can be implemented in systems that lack a touch screen.

The general purpose or usage of the just-mentioned components will now be described.

The touch screen 110 displays an image under control of the controller 150. In particular, the touch screen 110 displays an input keyboard on which a plurality of different objects for inputting a password are displayed. Here, the objects may be realized as numbers, letters, symbols, figures, characters, or combinations thereof but are not limited thereto. The objects may be thought of as a plurality of authentication interaction symbols, displayed in an arrangement.

If the objects are numbers, the touch screen 110 may randomly arrange a plurality of numbers to display the plurality of numbers on the input keyboard. That is to say, the plurality of authentication interaction symbols may be implemented by user interface objects that bear numerals, and the initial arrangement of the plurality of authentication interaction symbols may be a random arrangement. In one example, the arrangement of the plurality of authentication interaction symbols may be changed to another random arrangement of the symbols by shaking the device. In other words, if a shake of the touch screen 110 is sensed, the plurality of numbers displayed on the input keyboard of the touch screen 110 may be changed.

In some exemplary embodiments mentioned below, the plurality of authentication interaction symbols may include a timer or a digital compass displayed on the touch screen 110.

The touch screen 110 senses a touch input of a user. Here, a touch method of the touch screen 110 may be one of a resistive touch method, a capacitive touch method, an infrared (IR) touch method, and an ultrasonic touch method but is not limited thereto.

Some exemplary embodiments employ the sensor 120. The sensor 120 senses a direction, a motion, etc. of the portable device 100. Here, the sensor 120 may use a terrestrial magnetism sensor to sense the direction of the portable device and may use a gyro sensor, an acceleration sensor, etc. to sense the motion of the portable device 100.

Figure 15:
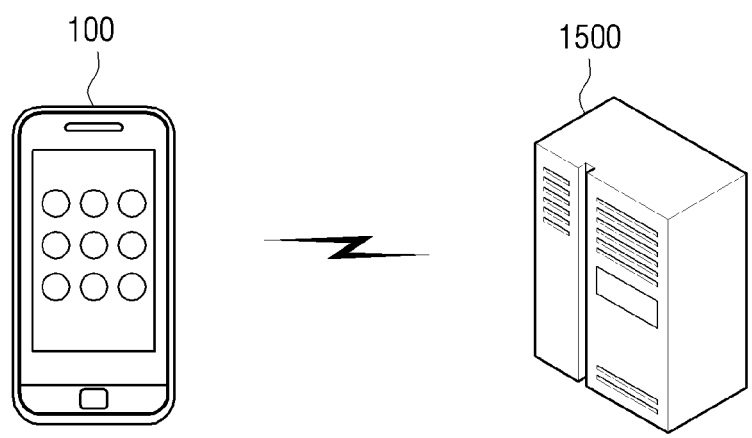
FIGS. 15 and 16 are views illustrating a password authenticating system including a portable device and a server according to an exemplary embodiment.

Some exemplary embodiments use the communicator 130, which may communicate with an external server 1500 (see FIG. 15). In detail, the communicator 130 may transmit a sequence of information that reflects inputs provided by a user, as a password, to the external server 1500. Therefore, in some exemplary embodiments, a determination, as to whether the device should be deemed to have been placed into an authenticated state, is carried out by an external server for transactions such as such as e-commerce, etc.

The vibration motor 140, which is used in some exemplary embodiments, generates vibrations of the portable device 100. In detail, the vibration motor 140 may generate the vibrations under control of the controller 150 whenever a time of a timer is counted.

The controller 150 receives a manipulation of a user to control an overall operation of the portable device 100. In detail, the controller 150 may authenticate the password through a manipulation of the user using the input keyboard which is displayed on the touch screen 110 of the portable device 100. That is to say, the controller is provided with input signals that reflect user manipulations of the device, and the controller responds to the input signals by carrying out various actions in various exemplary embodiments.

A number of specific exemplary embodiments will now be discussed.

In one exemplary embodiment, the controller 150, responds to input signals by modifying the arrangement of the objects arranged on the input keyboard. When the objects or authentication interaction symbols are in an arrangement or pattern that matches a previously set authentication arrangement, the controller authenticates the user. That is, the controller determines the device to have been placed into an authenticated state.

Figure 2A:
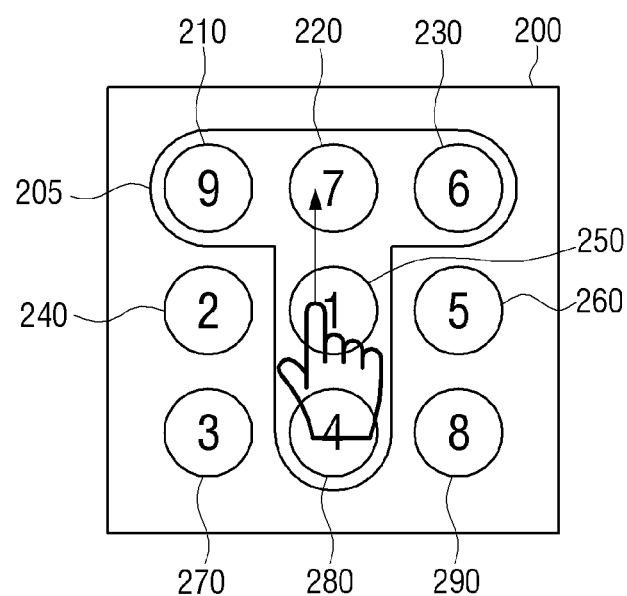
FIGS. 2A through 9D are views illustrating methods of authenticating a password of a portable device according to various exemplary embodiments.

Referring now, in particular, to FIG. 2A, there is shown a plurality of authentication interaction symbols in an arrangement. In this example, the initial arrangement is generated so as to appear to be out of sequence or in a random arrangement. Reference numeral 205 refers to a subset of the plurality of authentication interaction symbols that are relevant to a previously set authentication arrangement. The designated position 205 of the input keyboard may optionally be displayed to be distinguished from the other positions of the input keyboard as shown in FIG. 2A by a line surrounding certain ones of the authentication interaction symbols.

If a first object arranged on the input keyboard is dragged over where a second object is displayed, the controller 150 may change positions of the first and second objects with each other. That is to say, in response to an input signal (i.e., the dragging of one object over another, in this example), the controller modifies the arrangement of the symbols to display a subsequent arrangement of the symbols.

In detail, as shown in FIG. 2A, the plurality of authentication interaction symbols are the numerals 1-9 which are arranged in a random sequence of 9, 7, 6, 2, 1, 5, 3, 4, and 8 on first through ninth keys of the touch screen 110. In this example, an authentication arrangement of the symbols, previously set, is to have 9, 1, and 5 arranged on a first line (in corresponding positions 210, 220, and 230) and, 1, 7, and 4 arranged on a second column (in corresponding positions 220, 250, and 280). This authentication arrangement may be understood to be the "password" in this embodiment.

Figure 2B:
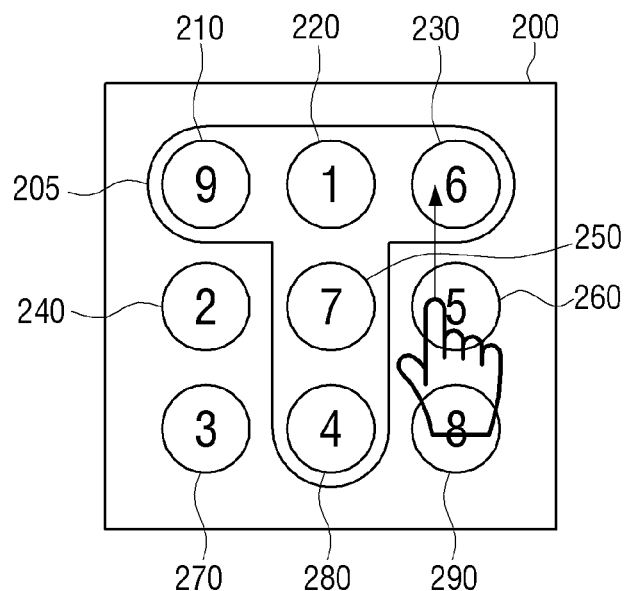

If the fifth key 250 (which bears numeral 1) is dragged over the second key 220 (which bears numeral 7, as shown in FIG. 2A, to change 7 of the second key 220 with 1 of the fifth key 250, the controller 150 changes the numerals of the fifth and second keys 250 and 220 with each other. That is, in response to an input signal (i.e., dragging the 1 onto the 7 in FIG. 2A), the controller modifies the arrangement of symbols to display a subsequent arrangement of the symbols as shown in FIG. 2B. Therefore, as shown in FIG. 2B, on the touch screen 110, 7 is positioned on the fifth key 250, and 1 is positioned on the second key 220.

Figure 2C:
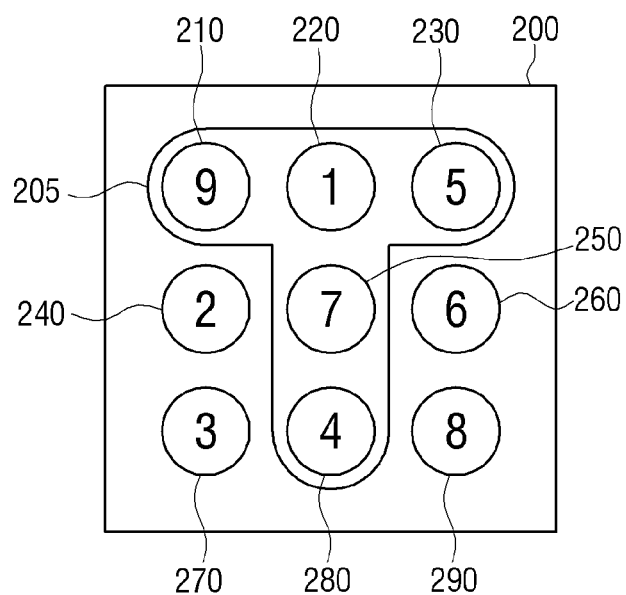

If the sixth key 260 (which bears numeral 5) is dragged over the third key 230 (which bears numeral 6) as shown in FIG. 2B, in order to change 6 of the third key 230 with 5 of the sixth key 260, the controller 150 changes numbers of the sixth and third keys 260 and 230. The controller, in response to the input signal (here, the dragging of the 5 onto the 6), again modifies the arrangement of the symbols and displays another subsequent arrangement of the symbols as shown in FIG. 2C. Therefore, as shown in FIG. 2C, on the touch screen 110, 6 is positioned on the sixth key 260, and 5 is positioned on the third key 230.

Therefore, since 9, 1, and 5 are arranged on the first line (210, 220, and 230), and 1, 7, and 4 are arranged on the second column (220, 250, and 280) due to the above-described operation, the controller 150 may authenticate the password. To put it another way, since the subsequent arrangement of the authentication interaction symbols matches the previously set authentication arrangement, the controller determines the device to have been placed into an authenticated state.

To summarize, in the preceding example, the objects displayed on the display may be thought of, in a more general sense, as authentication interaction symbols. Moreover, the authentication interaction symbols may be understood to have, at any given time, a particular arrangement. The user interactions with the objects on the display may be provided to the controller 150 as input signals. The controller modifies the arrangement of the symbols displayed on the display to provide a subsequent arrangement of the symbols. By manipulating the plurality of authentication interaction symbols one or more times, the user causes the generation of one or more subsequent arrangements of the symbols. When one of these subsequent arrangements of the symbols matches a previously set authentication arrangement, the device is determined by the controller to have been placed into an authenticated state, and operations previously prohibited are now enabled.

In the preceding example, the first arrangement was shown in FIG. 2A. The user manipulations on the touch screen, as shown in FIG. 2B, resulted in input signals being provided to the controller, which modified the arrangement of the symbols. The subsequent arrangement of the symbols was shown in FIG. 2C. In the preceding example, the previously set authentication arrangement of the plurality of authentication interaction symbols was any arrangement in which the top row included the sequence 9, 1, 5 and the center column included the sequence 1, 7, 4 in the positions shown. Thus, when the controller detected that a subsequent arrangement of the symbols matched this previously set authentication arrangement, the controller determined the device to have been placed into an authenticated state. In this example, the input signals that result in the re-arrangement of the authentication interaction symbols are input signals that reflect the dragging of one symbol onto or toward another. Since an object may be moved from one position to another by processes that are different from dragging, but have a similar effect, it may be more generally said that the input signals reflect the movement of one of the authentication interaction symbols from one position to another position.

FIGS. 3A-3D show another example along these lines, but the input signals that result in the re-arrangement of the authentication interaction symbols are input signals that reflect the selection of two of the authentication interaction symbols. If the first object arranged on the input keyboard is touched, and the second object arranged on the input keyboard is touched, the controller 150 may change positions of the first and second objects with each other.

In detail, as shown in FIG. 3A, 9, 7, 5, 2, 1, 6, 3, 4, and 8 are sequentially arranged on first through ninth keys 310 through 390 of the touch screen 110. Here, as a previously set authentication arrangement, or password, 9, 1, and 5 are arranged on a first line (310, 320, and 330), and 1, 7, and 4 are arranged on a second column (320, 350, and 380).

Figure 3A:
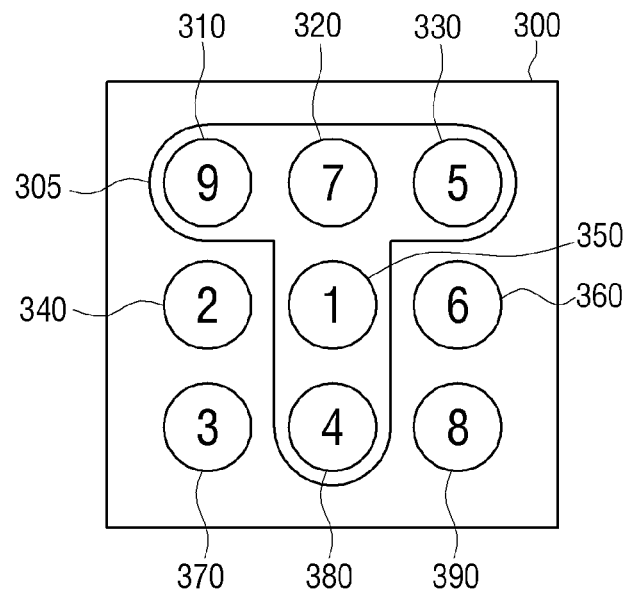
Figure 3B:
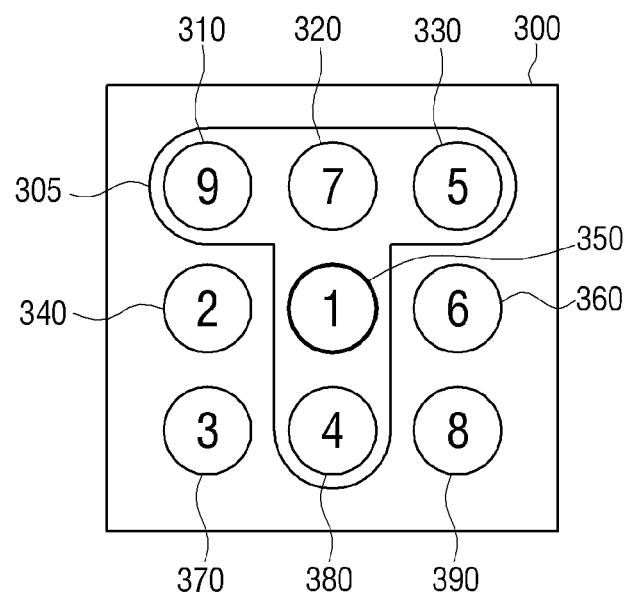

Referring to FIG. 3A, if the fifth key 350 (bearing numeral 1) is touched to change 7 of the second key 320 with 1 of the fifth key 350, the controller 150 displays the fifth key 350 to distinguish the fifth key 350 from the other keys as shown in FIG. 3B.

Figure 3C:
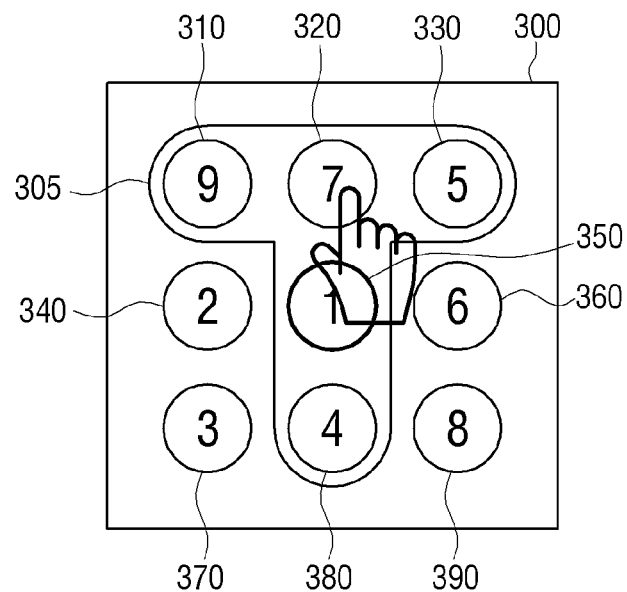
Figure 3D:
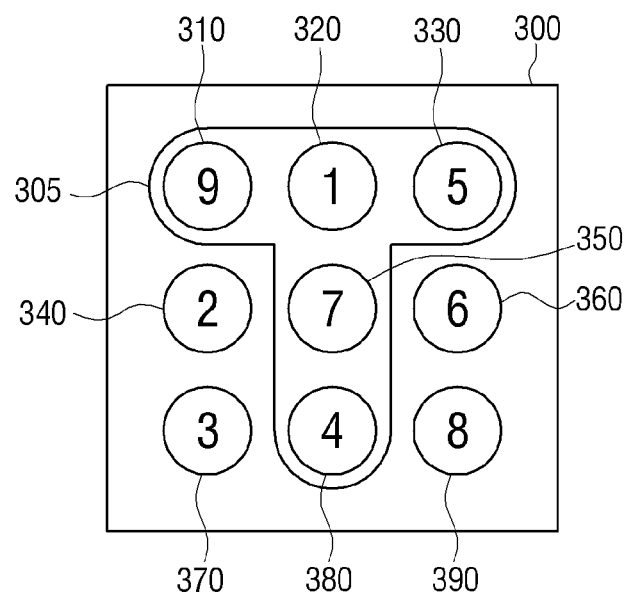

If the second key 320 to be changed is touched as shown in FIG. 3C, the controller 150 changes numbers of the fifth and second keys 350 and 320 as shown in FIG. 3D. Therefore, as shown in FIG. 3D, on the touch screen 110, 1 is positioned on the second key 320, and 7 is positioned on the fifth key 350. In other words, in response to an input signal (here, the sequential selection of the symbol in position 350 and then the symbol in position 320), the initial arrangement shown in FIG. 3A is modified so as to display a subsequent arrangement of the symbols as shown in FIG. 3D.

Now, the subsequent arrangement of the symbols matches the previously set authentication arrangement with 9, 1, and 5 arranged on the first line (310, 320, and 330), and 1, 7, and 4 arranged on the second column (320, 350, and 380). Thus, due to the above-described operation, the controller 150 may authenticate the password. That is to say, the device may be determined to have been placed into an authenticated state.

In the preceding example, the plurality of authentication interaction symbols are again user interface objects that include numerals, but as mentioned earlier in this discussion numerals are not the only possible implementation. Likewise, the preceding example discussed the selection of two symbols at different times, but it is also possible to select the two symbols at the same time, depending on the hardware implementation.

In the preceding example, the user could modify the arrangement of the symbols to display a subsequent arrangement of the symbols by exchanging the respective positions pairs of symbols. Once any subsequent arrangement matched the previously set authentication arrangement (i.e., the first row and the second column matched the 9, 1, 5 and 1, 7, 4 pattern), the device was determined by the controller to have been placed into an authenticated state.

Figure 4A:
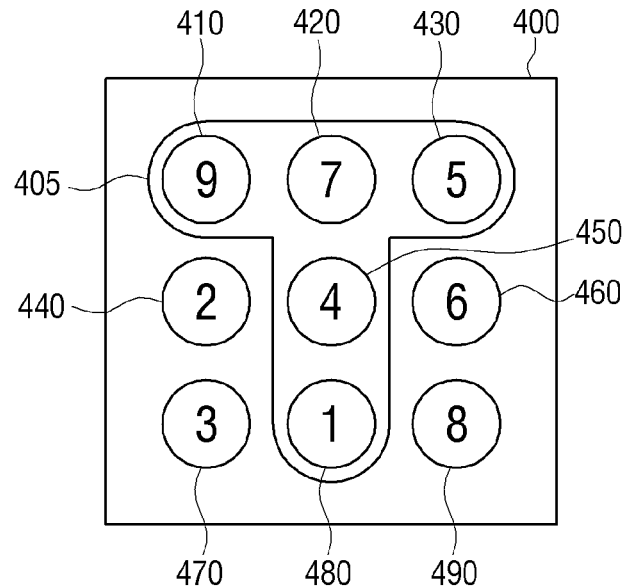
Figure 4B:
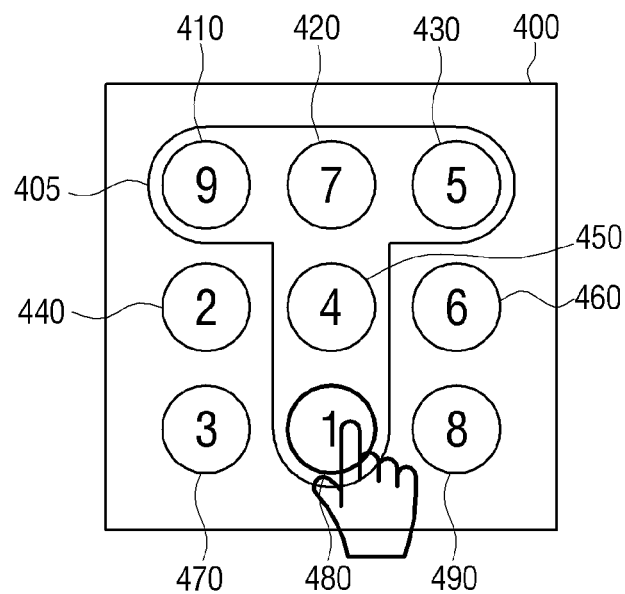
Figure 4C:
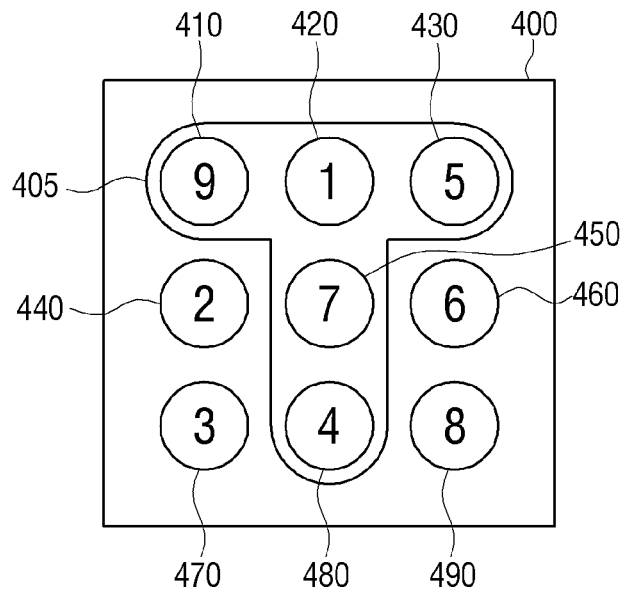

Another example is shown in FIGS. 4A-4C. In this example, the input signal is generated in response to a selection of a symbol in connection with a physical motion of the device. For example, if the first object arranged on the input keyboard is touched, and upward and downward motions of the portable device 100 are sensed, the controller 150 scrolls and changes a column including the first object. If the first object is touched, and left and right motions of the portable device 100 are sensed, the controller 150 scrolls and changes a line including the first object.

In detail, as shown in FIG. 4A, 9, 7, 5, 2, 4, 6, 3, 1, and 8 are sequentially arranged on first through ninth keys 410 through 490 of the touch screen 110. Here, as a password of a designated position, 9, 1, and 5 are arranged on a first line (410, 420, and 430), and 1, 7, and 4 are arranged on a second column (420, 450, and 480).

Therefore, if the eighth key 480 (bearing numeral 1) is touched among keys arranged on the second column (420, 450, and 480) to arrange 1, 7, and 4 on the second column (420, 450, and 480), the controller 150 displays the eighth key 480 as shown in FIG. 4B so as to distinguish the eighth key 480 from the other keys.

If a downward motion of the portable device 100 is sensed through the sensor 120, the controller 150 scrolls down positions of keys of the second column including the selected eighth key 480, one by one, to change the positions (i.e., to modify the arrangement of the symbols to display a subsequent arrangement of the symbols). Therefore, as shown in FIG. 4C, the controller 150 positions 7 of the second key 420 onto the fifth key 450, 4 of the fifth key 450 onto the eighth key 480, and 1 of the eighth key 480 into the second key 420.

Accordingly, since 1, 7, and 4 are arranged on the second column (420, 450, and 480) due to the above-described operation, this subsequent arrangement of the symbols matches the previously set authentication arrangement, and the controller 150 may determine the device to have been placed into an authenticated state (i.e., to authenticate the password).

In the above-described exemplary embodiment, if a downward motion of the portable device 100 is sensed, the controller 150 scrolls the arrangement of the symbols downwards to display a subsequent arrangement of the symbols. However, this is only an exemplary embodiment. If an upward motion of the portable device 100 is sensed two times, for example, the controller 150 may arrange 1, 7, and 4 on the second column (420, 450, and 480).

Also, in the above-described exemplary embodiment, upward and downward physical motions of the portable device 100 are sensed to scroll numbers in a columnar direction. However, this is only an exemplary embodiment. If a selected key is dragged upward or downward to scroll the numbers in a columnar direction, the controller 150 may scroll the numbers in the columnar direction.

Similarly, left and right motions of the portable device 100 may be sensed to scroll numbers in a linear direction, but this is only an exemplary embodiment. If a selected key is dragged in left and right directions in order to scroll numbers in a linear direction, the controller 150 may scroll the numbers in the linear direction.

In the preceding example, the input signals were received by the controller to modify the arrangement of the plurality of authentication interaction symbols, so as to achieve one or more subsequent arrangements of the symbols. The input signals were generated in response to a selection of one of the symbols, and also in response to a physical motion of the device.

Another example is shown in FIGS. 5A-5D. In this example, as in the immediately preceding example, the input signals are generated in response to a selection of one of the plurality of authentication interaction symbols, and also in response to a physical motion of the device. In the preceding example, the physical motion of the device indicated a direction of movement for the selected symbol. In this example, however, the physical motion of the device indicates a mathematical operation to be performed upon the selected one of the symbols.

If a first number arranged on the input keyboard is touched, one of four fundamental arithmetic operations, corresponding to a preset direction in which the portable device 100 is inclined, is selected, and a second number arranged on the input keyboard is touched, the controller 150 may calculate the first and second numbers through one of the four fundamental arithmetic operations corresponding to the preset direction to change the first number according to the calculation result.

In detail, as shown in FIG. 5A, 9, 1, 6, 2, 7, 5, 3, 4, and 8 are sequentially arranged on first through ninth keys 510 through 590 of the touch screen 110. Here, as a password of a designated position, 9, 1, and 5 are arranged on a first line (410, 420, and 430), and 1, 7, and 4 are arranged on a second column (420, 450, and 480).

Figure 5A:
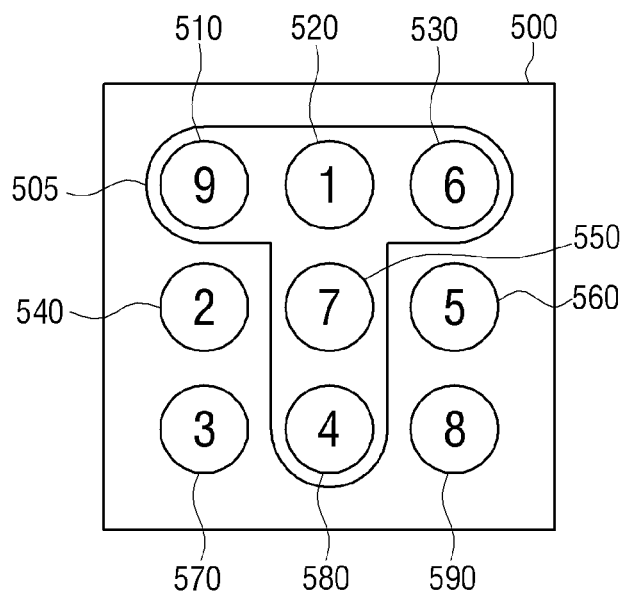
Figure 5B:
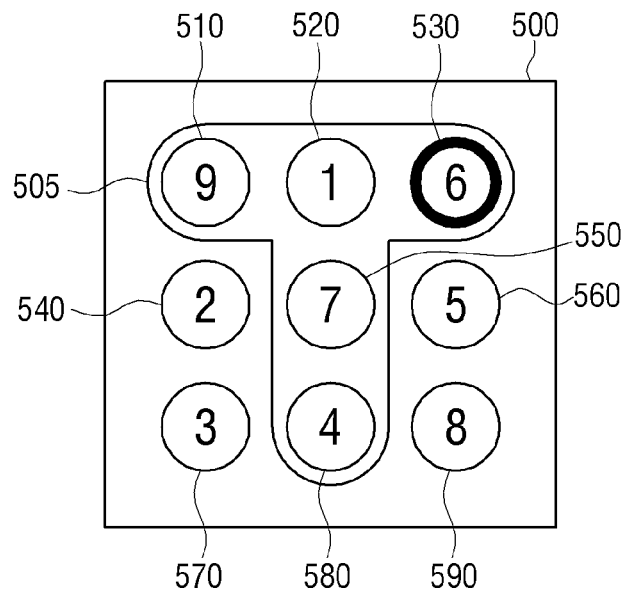
Figure 5C:
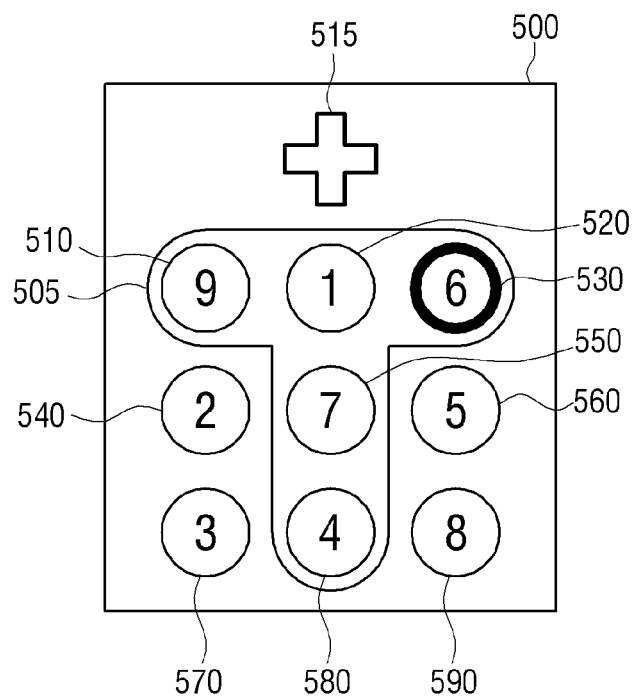

Therefore, if the third key 530 is touched to change 6 positioned on the third key 530 to 5, the controller 150 displays the third key 530 to distinguish the third key 530 from the other keys as shown in FIG. 5C.

If the portable device 100 is inclined to the left, the sensor 120 senses the inclination of the portable device 100. If the portable device 100 is inclined to the left, the controller 150 displays an addition sign 515 on an upper part of the touch screen 110 as shown in FIG. 5C, wherein the addition sign 515 is one of the four fundamental arithmetic operations corresponding to the left inclination of the portable device 100.

Figure 5D:
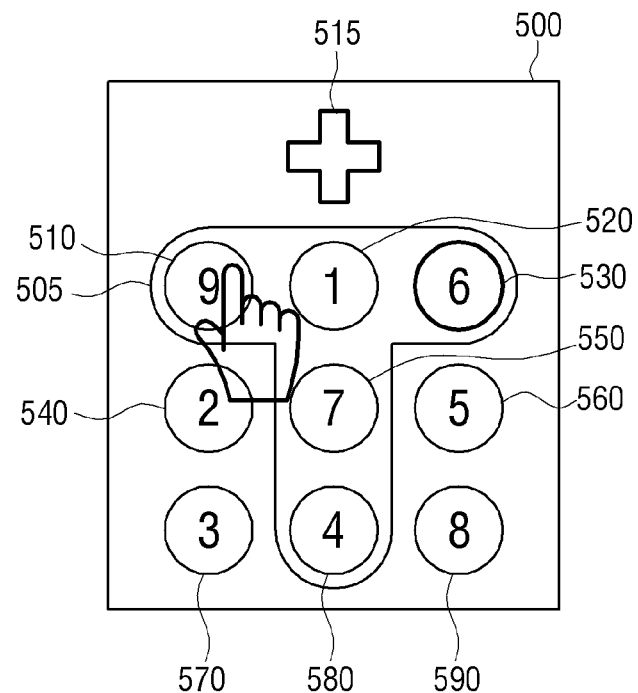
Figure 5E:
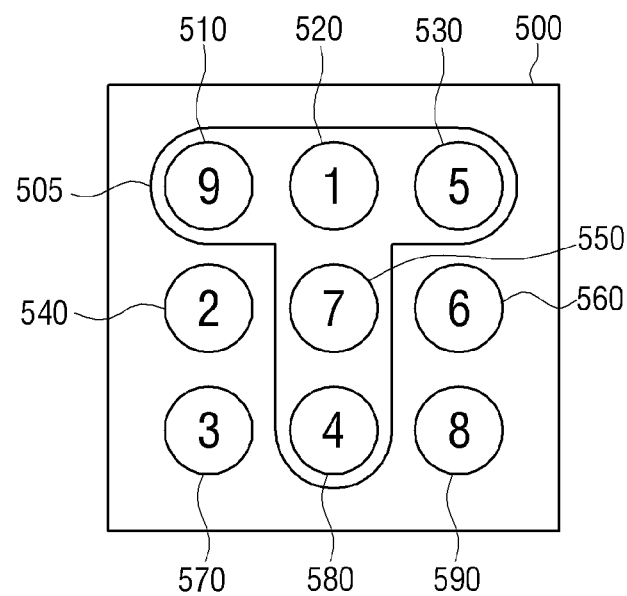

Also, if the first key 510 is touched as shown in FIG. 5D, the controller 150 adds numbers of selected two keys to display the addition result on the third key 530 which is first selected. In this case, if the addition result is greater than or equal to 10, the controller 150 may display only a one-digit number of the addition result. Therefore, as shown in FIG. 5E, the controller 150 displays only one-digit number 5 from 15 on the third key 530, wherein 15 is a value obtained by adding numbers of the third and first keys 530 and 510.

Therefore, since 9, 1, and 5 are arranged on the first line (510, 520, and 530), and 1, 7, and 4 are arranged on the second column (520, 550, and 580) due to the above-described operation, the controller 150 determines that this subsequent arrangement of the authentication interaction symbols matches the previously set authentication arrangement, and determines the device to have been placed into an authenticated state. This may also be thought of as authenticating the password.

Figure 6A:
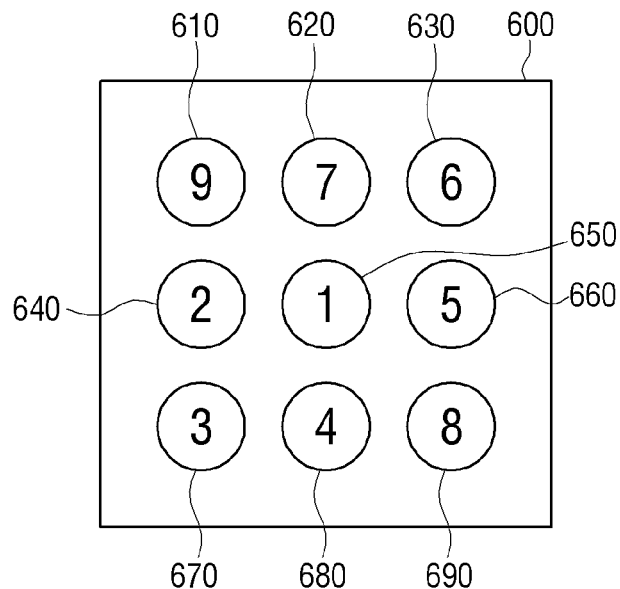
Figure 6B:
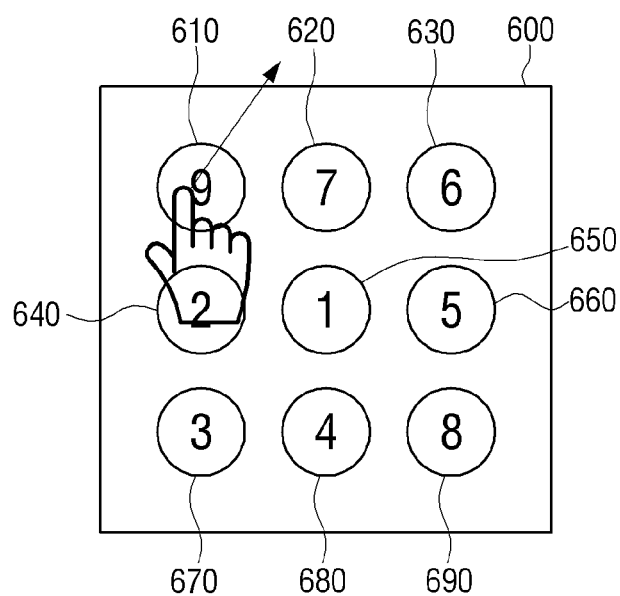
Figure 6C:
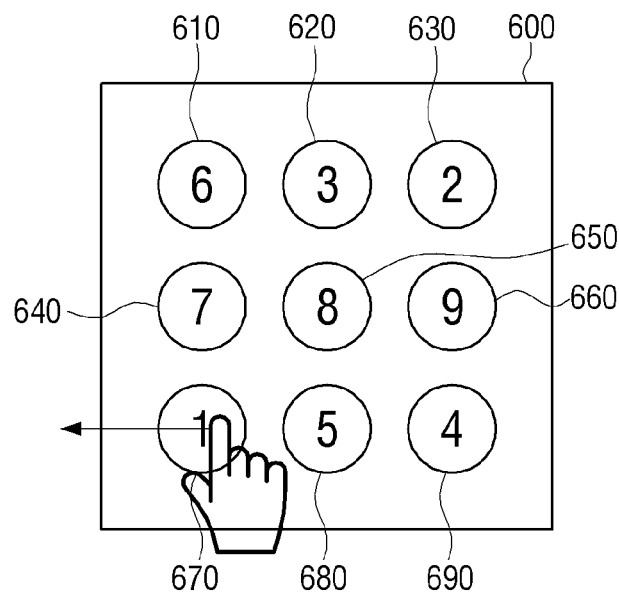

Another exemplary embodiment is illustrated in FIGS. 6A-6C. In this example, the plurality of authentication interaction symbols is displayed in a random arrangement on the display. The input signals that are generated based on user manipulations include an indication of a selected symbol, and also an indication of a respective direction. The input signals and the direction information are collected, resulting in a sequence of selected symbol indications with respective direction information. When the sequence matches a previously set authentication sequence, the device is determined to have been placed into an authenticated state. The previously set authentication sequence may be thought of as the password, in this example.

If at least one of a plurality of objects arranged on the input keyboard is touched to be dragged, the controller 150 compares the touched object and the dragged direction with the preset password to authenticate a user. Here, the password may include a type of the selected object and the dragged direction of the corresponding object.

In detail, as shown in FIG. 6A, 9, 7, 6, 2, 1, 5, 3, 4, and 8 are sequentially arranged on first through ninth keys 610 through 690 of the touch screen 110. Here, 9 is dragged to the top right, and 1 is dragged to the left.

If dragging of the first key 610 of FIG. 6B to the top right is sensed, the controller 150 senses that 9 has been dragged to the top right. The selection of the 9 symbol and the direction information of top right are accumulated so as to form part of a sequence of selected symbol indications with respective direction information.

Also, after the accumulation of the foregoing, the controller 150 randomly rearranges keys of an input keyboard 600 as shown in FIG. 6C. Therefore, 6, 3, 2, 7, 8, 9, 1, 5, and 4 are sequentially arranged on the first through ninth keys 610 through 690 of the touch screen 110.

If dragging of the seventh key 670 of FIG. 6C to the left is sensed, the controller 150 senses that 1 has been dragged to the left.

Therefore, the controller 150 senses that 9 has been dragged to the top right, and 1 has been dragged to the left and thus authenticates the password.

In the above-described exemplary embodiment, if two numbers are touched and respectively dragged in preset directions, a password is authenticated. However, this is only an exemplary embodiment. A plurality of numbers may be touched and respectively moved in preset directions.

In the preceding example, the plurality of authentication interaction symbols were displayed in an initial random arrangement as shown in FIG. 6A. As shown in FIG. 6B, the user selected one of the plurality of authentication interaction symbols, namely, the object bearing numeral 9. At the time of the user input, an input signal is sent to the controller with respect to the selected symbol. In addition, the direction of the user's finger swipe (or stylus stroke) is also provided to the controller as a respective direction for the input signal. Thus, the controller is provided with an input signal, that the controller can determine relates to the icon 610, and also a respective direction that the controller can determine has a top right direction.

As the user continues to interact with the display, a sequence of selected symbol indications with respective direction information is accumulated. When the sequence of selected symbol indications with respective direction information matches a previously set authentication sequence (which in this example is 9 with a top right direction and 1 with a left direction), the controller determines that the device may have been placed into an authenticated state. In this example, moreover, after each detected input signal, the controller may, in an exemplary embodiment, regenerate the display to show the plurality of authentication interaction symbols in a subsequent random arrangement.

Another exemplary embodiment is discussed now with respect to FIGS. 7A-7D. If an object of the input keyboard is touched, the controller 150 may count a time taken until the touch of the object is released and display the counted time on a timer. If the object is touched a preset number of times, the controller 150 may combine times counted at all touches of the object and compare the combined time with a preset password to authenticate a user.

Figure 7A:
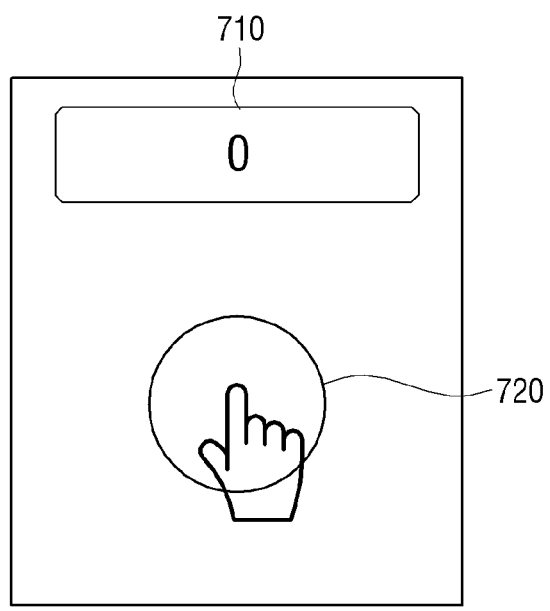

In detail, as shown in FIG. 7A, as a screen for starting to authenticate a password, the touch screen 110 may display an object 720 (an object will be referred to as an icon in the descriptions of 7A through 7D) and a timer 710. Here, a preset password is 4 and 2.

Also, if the icon 720 is touched as shown in FIG. 7A, the controller 150 starts counting the timer 710. Here, when the timer 710 is counted, the controller 150 counts numbers of the timer 710.

Here, the controller 150 drives the vibration motor 140 to generate vibrations whenever numbers are counted, so that the user further easily recognizes the vibrations. Also, if the touch of the icon 720 continues for a preset threshold time or more, the controller 150 may accelerate a counting speed. For example, the controller 150 may count from 1 to 3 for 3 seconds but counts from 1 to 9 for 6 seconds.

Figure 7B:
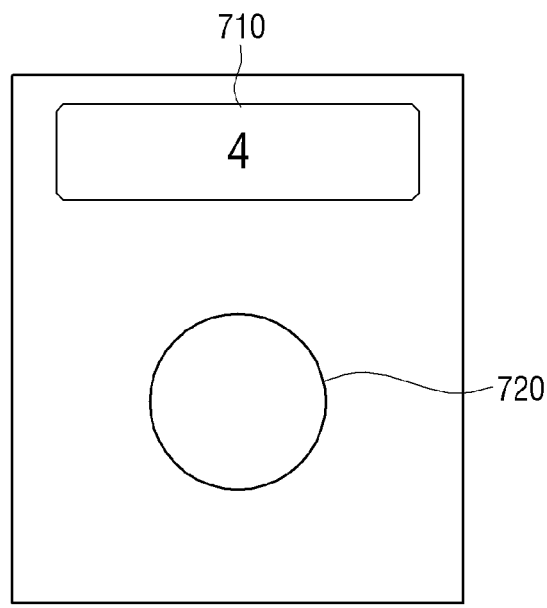

If the touch of the icon 720 is released when the timer 710 is displaying 4 as shown in FIG. 7B, the controller 150 senses 4 displayed on the timer 710.

Figure 7C:
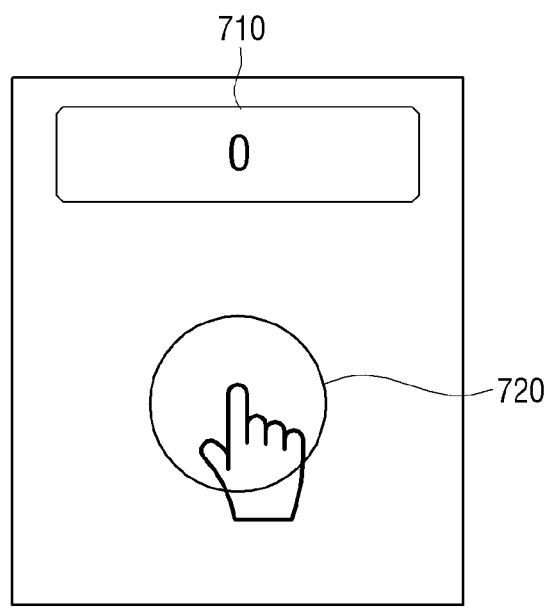

The controller 150 initializes counting as shown in FIG. 7C.

If the icon 720 is touched again, the controller 150 starts re-counting the timer 710.

Figure 7D:
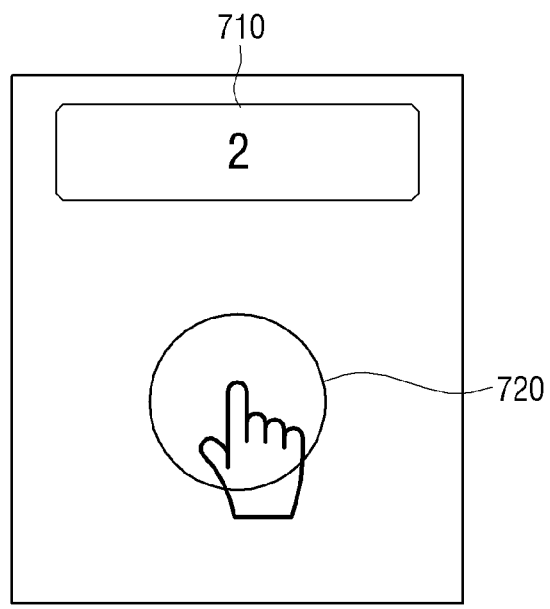

If the touch of the icon 720 is released when the timer 710 is displaying 2 as shown in FIG. 7D, the controller 150 senses 2 displayed on the timer 710.

Accordingly, since 4 and 2 are sensed as the preset password, the controller 150 authenticates the password.

In the preceding example, the controller detected, as input signals, the user's pressing and releasing of the object 720. The controller also detected a respective timing of the input for each of the one or more input signals. By recording this information, the controller obtained a sequence of signal input timing values. In the preceding example, the signal input timing values that reflected the sensing of 4 and 2 were matched with the previously set authentication sequence of 4 and 2, and this match is what permitted the controller then to determine the device to have been placed into an authenticated state.

According to another exemplary embodiment, shown in FIGS. 8A-8E, the touch screen 110 may display input keys 820 through 828 on which a plurality of numbers are arranged, instead of the icon 720.

Figure 8A:
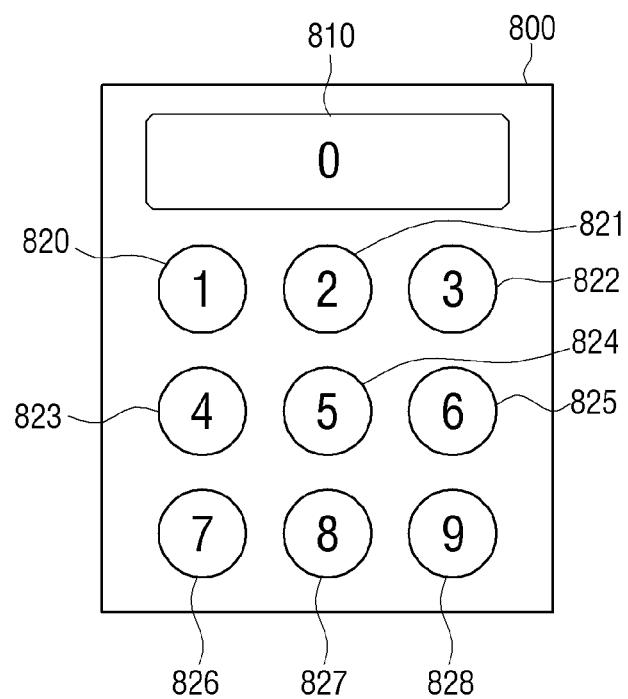

In detail, 1, 2, 3, 4, 5, 6, 7, 8, and 9 are sequentially arranged on first through ninth keys 820 through 828 of the touch screen 110 as shown in FIG. 8A. Here, a preset password is 9 and 1.

Figure 8B:
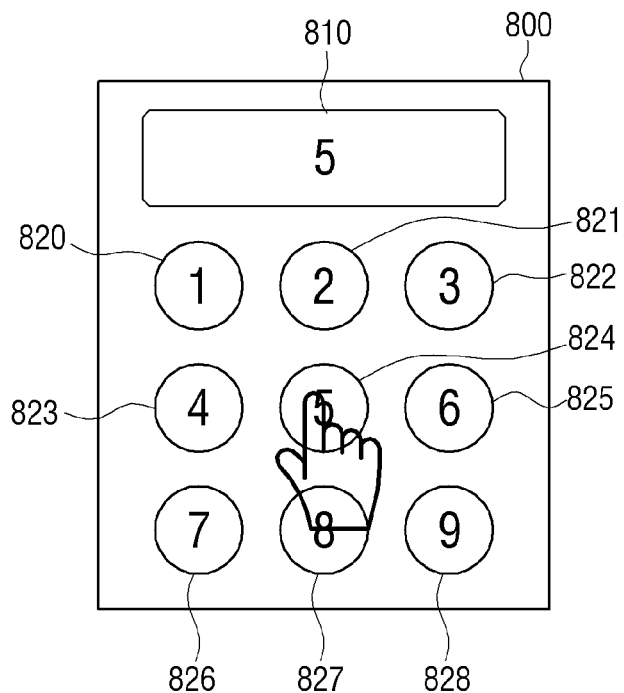

If the fifth key 824 of a plurality of keys of the input keyboard is touched, the controller 150 displays number 5 corresponding to the fifth key 825 on a timer 810 as shown in FIG. 8B.

When the fifth key 824 is being touched, the controller 150 counts the number of the timer 810.

Figure 8C:
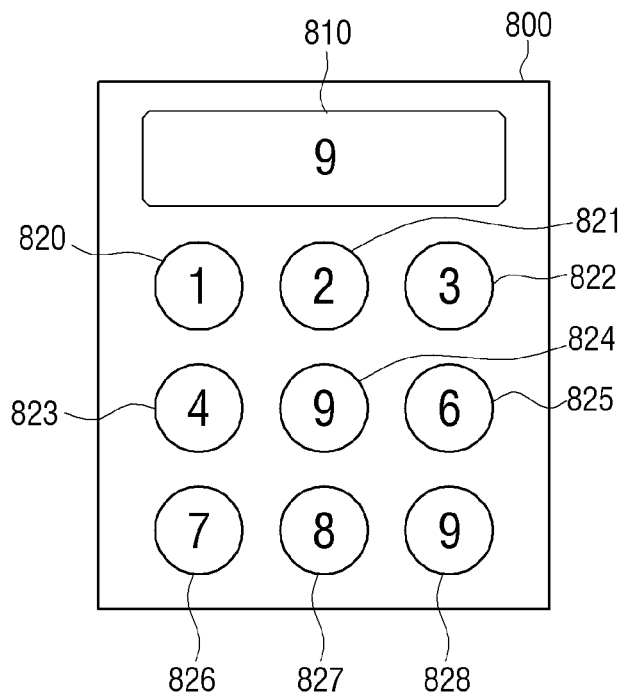

If the touch of the fifth key 824 is released when the timer 810 is displaying number 9 as shown in FIG. 8C, the controller 150 senses the number 9.

Figure 8D:
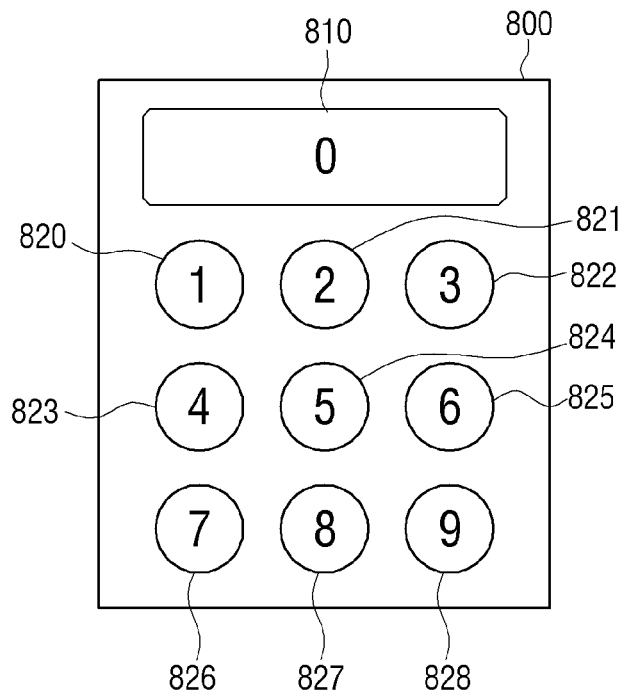

As shown in FIG. 8D, the controller 150 initializes the timer 810.

Figure 8E:
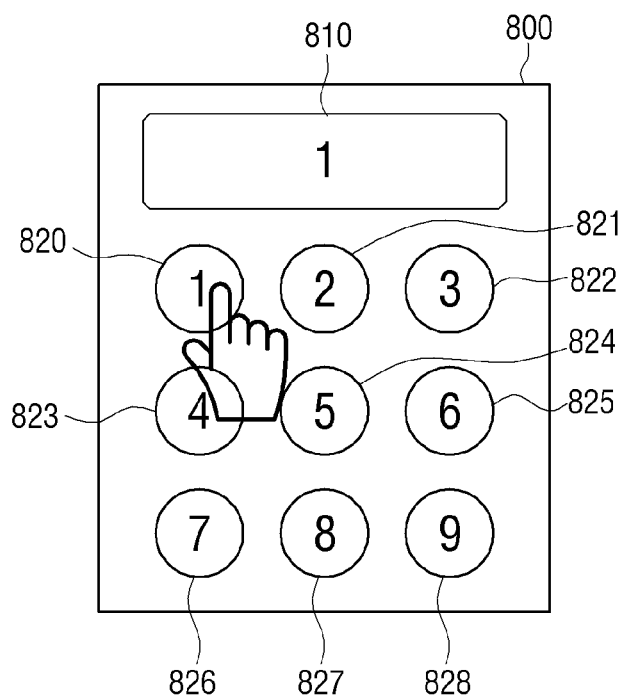

If the first key 820 of the input keyboard is touched, the controller 150 displays number 1 corresponding to the first key 820 on the timer 810 as shown in FIG. 8E.

If the touch of the first key 820 is immediately released, the controller 150 senses the number 1.

Accordingly, since 9 and 1 are sensed as the preset password, the controller 150 authenticates the preset password.

In the preceding example, although the timing start value was selectable by the user, it is still true that the controller detected one or more input signals, with respect to the one or more authentication interaction symbols, and also a respective timing of input for the one or more input signals, to obtain a sequence of signal input timing values. Likewise, when the sequence of signal input timing values matched the previously set authentication sequence of 9 and 1, the controller determined the device to have been placed into an authenticated state.

Another embodiment is illustrated in FIGS. 9A-9D. This exemplary embodiment is similar in some ways to the exemplary embodiment shown in FIGS. 6A-6C. Whereas the FIGS. 6A-6C were used to describe an exemplary embodiment in which the respective direction information indicated a stroke direction at the time of symbol selection, in the example now discussed with respect to FIGS. 9A-9C, the respective direction information indicates a physical orientation of the device at the time of symbol selection.

To this end, the controller 150 may display a direction of the portable device 100 sensed through the sensor 120 on a digital compass of the touch screen 110. Also, if at least one object is touched on the input keyboard, the controller 150 may compare the touched object and the direction of the portable device 100 with a preset password or authentication sequence. If the touched object and the direction of the portable device 100 correspond to the preset password, the controller 150 may authenticate the user.

Figure 9A:
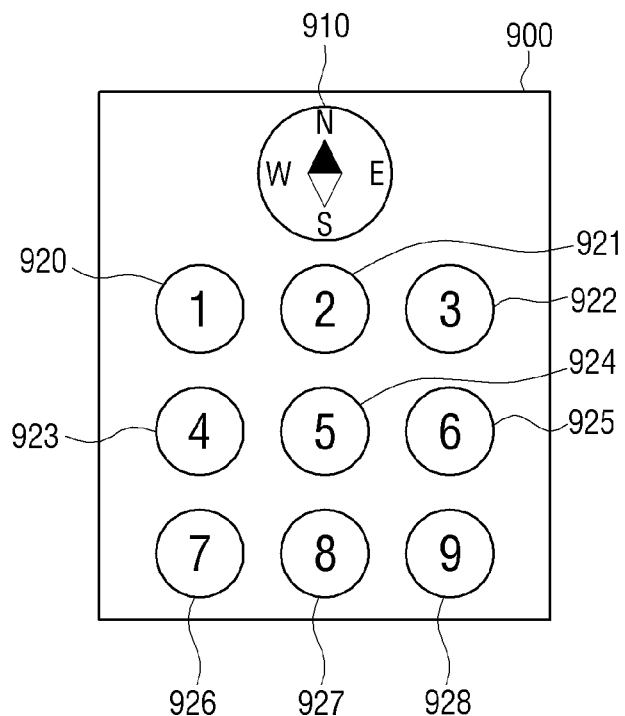

In detail, the touch screen 110 displays first and ninth keys 920 through 928 and a digital compass 910 as shown in FIG. 9A in order to authenticate a password. Here, a preset password is 9, 1, and a northeast (NE) direction.

Figure 9B:
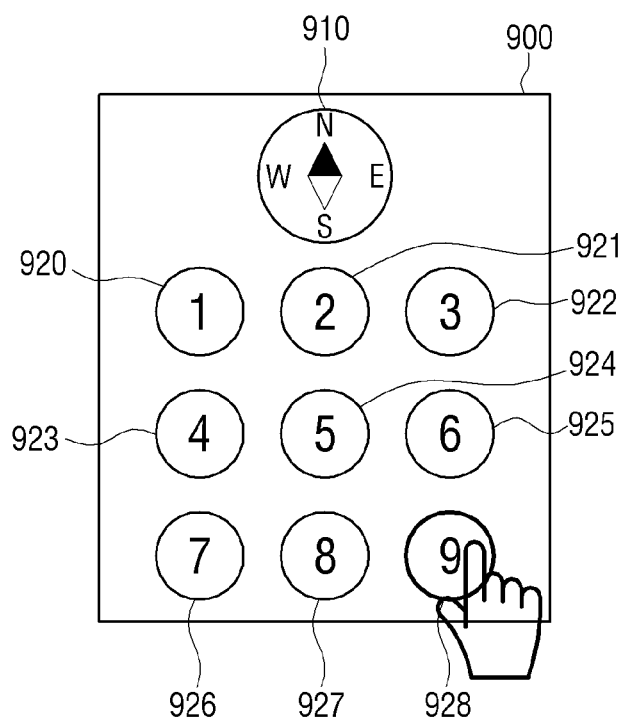

If the ninth key 928 is touched as shown in FIG. 9B, the controller 150 senses number 9 corresponding to the ninth key 928.

Figure 9C:
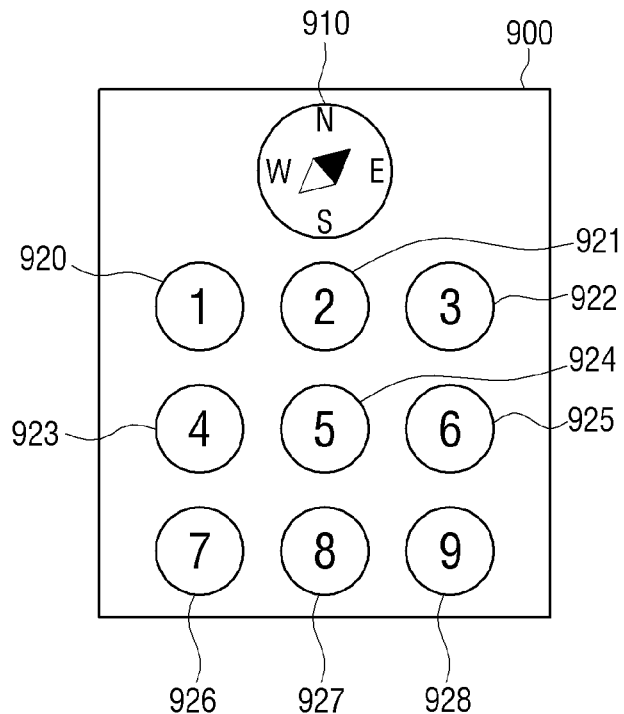

If a direction of the portable device 100 is sensed as an NE direction through the sensor 120, the controller 150 controls the digital compass 910 to point to the NE direction as shown in FIG. 9C.

Figure 9D:
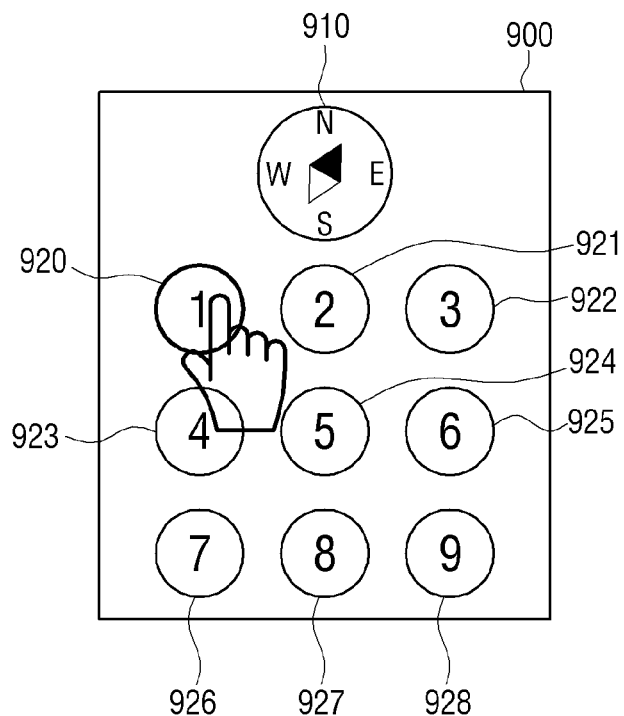

If the first key 920 is touched when the digital compass 910 points to the NE direction as shown in FIG. 9D, the controller 150 senses number 1 corresponding to the first key 920.

Therefore, since the numbers 9 and 1 and the NE direction are sensed as the preset password, the controller 150 may authenticate the preset password.

In the preceding example, the plurality of authentication interaction symbols were displayed in an initial arrangement as shown in FIG. 9A, together with a compass. As shown in FIG. 9B, the user selected one of the plurality of authentication interaction symbols, namely, the object bearing numeral 9. At the time of the user input, an input signal was sent to the controller with respect to the selected symbol. Thus, the controller was provided with an input signal that the controller could determine relates to the icon 928. Subsequently, the user oriented the device in a NE direction. Then, the controller was provided with an input signal that the controller could determine relates to the icon 920, and also the direction information for the device orientation (NE in this example) was provided to the controller as a respective direction information for the input signal. That is, the respective direction at the time of symbol selection of the 1 symbol indicated a physical orientation of the device. In other words, the respective direction for the input signal corresponding to the numeral 1 was the NE direction which indicated a physical orientation of the device at the time of symbol selection.

As the user continues to interact with the display, there is obtained by the controller a sequence of selected symbol indications with respective direction information. When the sequence of selected symbol indications with respective direction information matches a previously set authentication sequence (which in this example is 9, followed by selecting 1 when the physical orientation is NE), the controller determines that the device may have been placed into an authenticated state.

In the above-described exemplary embodiment, the password is sensed in orders of 9→NE direction→1, but this is only an exemplary embodiment. If the numbers 9 and 1, and the NE direction are sensed regardless of the orders, the controller 150 may authenticate the password.

In another exemplary embodiment, if a touch of at least one of a plurality of objects of the input keyboard and a motion of the portable device 100 at a touch time of the at least one object are sensed, the controller 150 may compare the touched object and the motion of the portable device at the touch time with a preset password. If the touched object and the motion of the portable device correspond to the preset password, the controller 150 may authenticate a user.

That is to say, in the preceding example, the direction information for the one or more input signals indicated a physical orientation of the device at the time of symbol selection. In the following example, the direction information indicates a physical motion of the device at the time of symbol selection.

In detail, when number 9 is selected as part of a preset password, a shake motion (a motion of shaking a portable device) is sensed because the user shakes the device while selecting the number 9. When number 1 is sensed as another part of the preset password, a shake motion is sensed because the user again shakes the device while selecting the number 1.

Accordingly, if a shake motion is sensed when a key corresponding to number 9 is touched, and a shake motion is sensed when a key corresponding to number 1 is touched, the controller 150 may authenticate a password.

In the above-described exemplary embodiment, a shake motion is exemplified as a motion of a portable device. However, this is only an exemplary embodiment, other motions (e.g., a rotation motion, etc.) may be motions of the portable device 100.

In the preceding example, the plurality of authentication interaction symbols were displayed in an initial arrangement. The user selected one of the plurality of authentication interaction symbols, namely, the object bearing numeral 9. At the time of the user input, an input signal was sent to the controller with respect to the selected symbol. Thus, the controller was provided with an input signal that the controller could determine relates to the 9 object. At the time of symbol selection, the user shook the device. The shaking of the device was, for example, detected by the occurrence of multiple rapid changes in direction of movement of the device. That is, the controller was provided not only with the input signal that indicated a selected one of the plurality of authentication interaction symbols, but also with a respective direction for the input signal (in this instance, multiple instances of direction information defining a shake motion of the device).

Next, the user selected the 1 symbol at the time of shaking the device. The selection of the 1 symbol by the user resulted in the detection of an input signal by the controller, and the shaking of the device by the user resulted in the detection of respective direction information for the input signal (here, again, multiple instances of direction information defining a shake motion). The respective direction information, at the time of symbol selection of the 1 symbol, thus indicates a physical movement or motion of the device. In other words, the respective direction information for the input signal, corresponding to the numeral 1, indicates that the device at the time of symbol selection was a shaking motion.

As the user continues to interact with the display, there is obtained by the controller a sequence of selected symbol indications with respective direction information. When the sequence of selected symbol indications with respective direction information matches a previously set authentication sequence (which in this example is 9 with shaking, followed by 1 with shaking), the controller determines that the device may have been placed into an authenticated state.

Also, as mentioned above, the direction information for the one or more input signals may define motions other than shake motions (e.g., a rotation motion may be detected based on appropriate direction information).

In preceding example, the device may have used a motion sensor, accelerometer, or the like to provide the direction information. As another method of authenticating a password, if a motion of a user recognized by a camera (not shown) of the portable device 100 is sensed, and the sensed motion of the user corresponds to a preset motion, the controller 150 may authenticate a password. In other words, the direction information may be obtained using a camera of the device.

According to the above-described various exemplary embodiments, the portable device 100 may improve security for authenticating a password in order to further reinforce a protection of personal information.

Methods of authenticating a password according to exemplary embodiments will now be described with reference to FIGS. 10 through 14.

Figure 10:
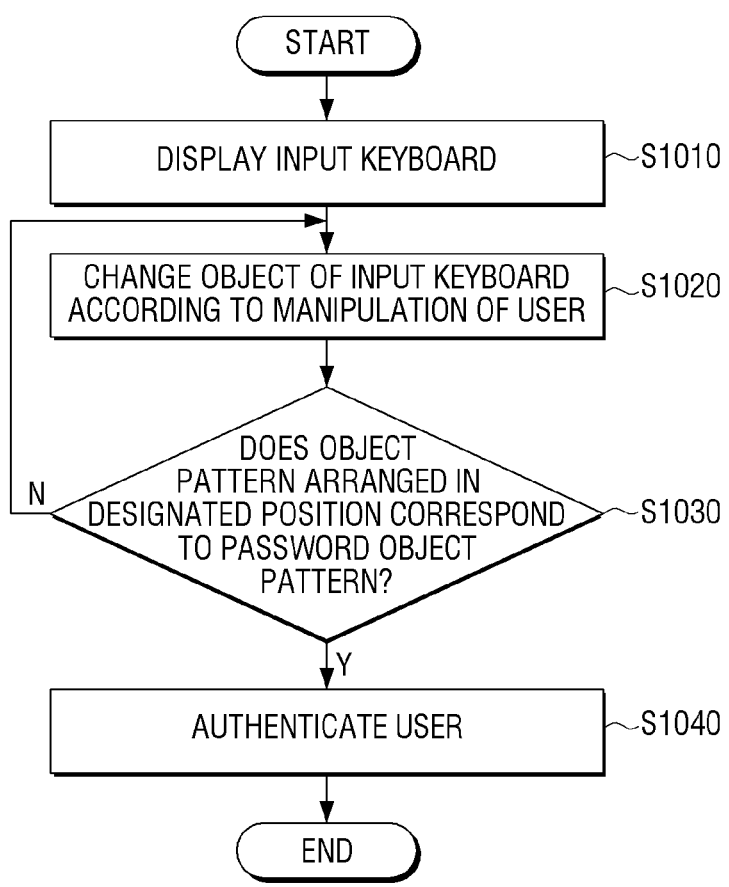
FIGS. 10 through 14 are flowcharts illustrating methods of authenticating a password of a portable device according to various exemplary embodiments.

FIG. 10 is a flowchart illustrating a method of determining whether an object pattern in a designated position of the touch screen 110 corresponds to a password object pattern to authenticate a password, according to an exemplary embodiment. In other words, FIG. 10 illustrates how an authentication method may be performed so as to detect when an arrangement of the authentication interaction symbols matches a previously set authentication arrangement.

In operation S1010, the portable device 100 displays an input keyboard on which a plurality of different objects are arranged (i.e., displays a plurality of authentication interaction symbols in an arrangement). Here, the plurality of different objects may be randomly arranged on the input keyboard. Also, a designated position in which a password object pattern is to be arranged may be displayed to be distinguished from the other portions as shown in FIG. 2A.

In operation S1020, the portable device 100 changes the positions of the objects of the input keyboard according to a manipulation of a user. That is, in response to in input signal, the arrangement of the symbols is modified so as to display a subsequent arrangement of the symbols. A number of exemplary ways of modifying the arrangement of the symbols have been discussed already, above.

In detail, if a first object arranged on the input keyboard is touched to be dragged into a position in which a second object is displayed, the portable device 100 may change positions of the first and second objects with each other. Also, if the first object arranged on the input keyboard is touched, and the second object arranged on the input keyboard is touched, the portable device 100 may change the positions of the first and second objects with each other If the first object arranged on the input keyboard is touched, and upward and downward motions of the portable device 100 are sensed, the portable device 100 scrolls and changes a column including the first object. If the first object touched, and left and right motions of the portable device 100 are sensed, the portable device 100 scrolls and changes a line including the first object.

If a first number arranged on the input keyboard is touched, one of four fundamental operations corresponding to a preset direction in which the portable device 100 is inclined is selected, and a second number arranged on the input keyboard is touched, the portable device 100 may calculate the first and second numbers by using one of the four fundamental operations corresponding to the preset direction to change the first number according to the calculation result.

In operation S1030, the portable device 100 determines whether an object pattern arranged in a designated position corresponds to a password object pattern (i.e., whether the subsequent arrangement of the symbols matches the previously set authentication arrangement).

If it is determined in operation S1030 that the object pattern in the designated position corresponds to the password object pattern, the portable device 100 authenticates a user in operation S1040 (i.e., the device is determined to have been placed into an authenticated state).

Figure 11:
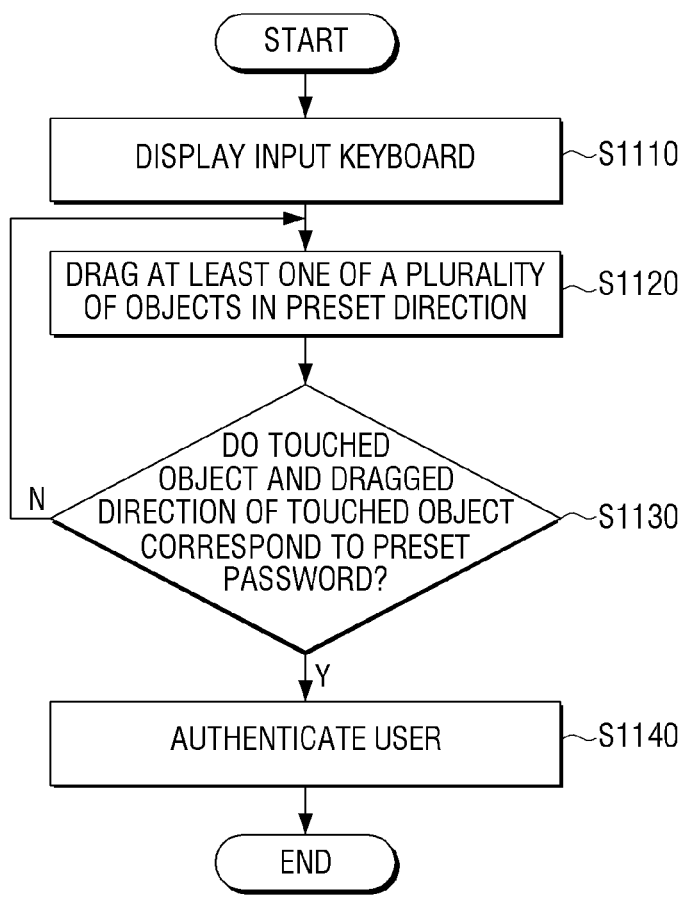

FIG. 11 is a flowchart illustrating an authentication method for a device, in which a sequence of selected symbol indications with respective direction information is matched to a previously set authentication sequence. That is to say, the authentication method uses a touched object and a dragged direction of the touched object, according to an exemplary embodiment.

In operation S1110, the portable device 100 displays an input keyboard on which a plurality of different objects are arranged (i.e., displays a plurality of authentication interaction symbols). Here, the plurality of different objects may be randomly arranged on the input keyboard.

In operation S1120, the portable device 100 senses whether at least one of the plurality of different objects has been dragged in a preset direction. In other words, in response to user manipulations, the controller is provided with one or more input signals, with respect to one or more selected ones of the plurality of authentication interaction symbols, and also respective direction information for the one or more input signals, to obtain a sequence of selected symbol indications with respective direction information.

In operation S1130, the portable device 100 determines whether a touched object and a dragged direction of the touched object correspond to a preset password. Here, the preset password includes an object and a dragged direction of the object. For example, number 1 of the preset password may be dragged to the right, and number 3 of the preset password may be dragged in an upward direction. This sequence of selected symbol indications with respective direction information is compared with a previously set authentication sequence.

If it is determined in operation S1130 that the touched object and the dragged direction of the touched object correspond to the preset password, the portable device 100 authenticates a user in operation S1140. In other words, when the sequence of selected symbol indications with respective direction information matches the previously set authentication sequence, the device is determined to have been placed into an authenticated state.

Figure 12:
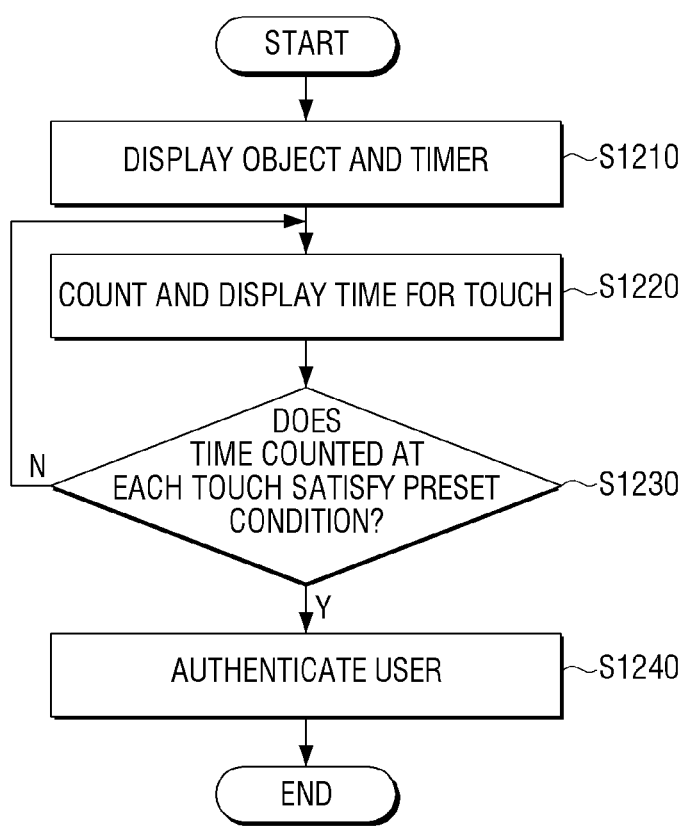

FIG. 12 is a flowchart illustrating a method of authentication for a device, in which a sequence of signal input timing values is compared to a previously set authentication sequence. That is, a touch time is counted so as to authenticate a password according to an exemplary embodiment.

In operation S1210, the portable device 100 displays at least one object and a timer for starting counting a touch time. Here, the object for starting counting the touch time may be a particular icon or a number key. If the object is the particular icon, and the particular icon is touched, the portable device 100 starts counting the touch time. If the object is the number key, and the number key is touched, the portable device 100 starts counting from a time corresponding to the touched number key.

In operation S1220, the portable device 100 counts the touch time and displays the counted touch time on a timer.

In operation S1230, the portable device 100 determines whether the time counted at each touch has satisfied a preset condition. Here, the preset condition is a condition for authenticating a password. For example, according to the preset condition, a time counted for a first touch may be 3, and a time counted for a second time may be 4. The time counted at each touch is remembered as a sequence of signal input timing values.

If it is determined in operation S1230 that the time counted at each touch has satisfied the preset condition, the portable device 100 authenticates a user in operation S1240. That is, the sequence of signal input timing values is compared with the previously set authentication sequence, and when there is a match, the device is determined to have been placed into an authenticated state.

Figure 13:
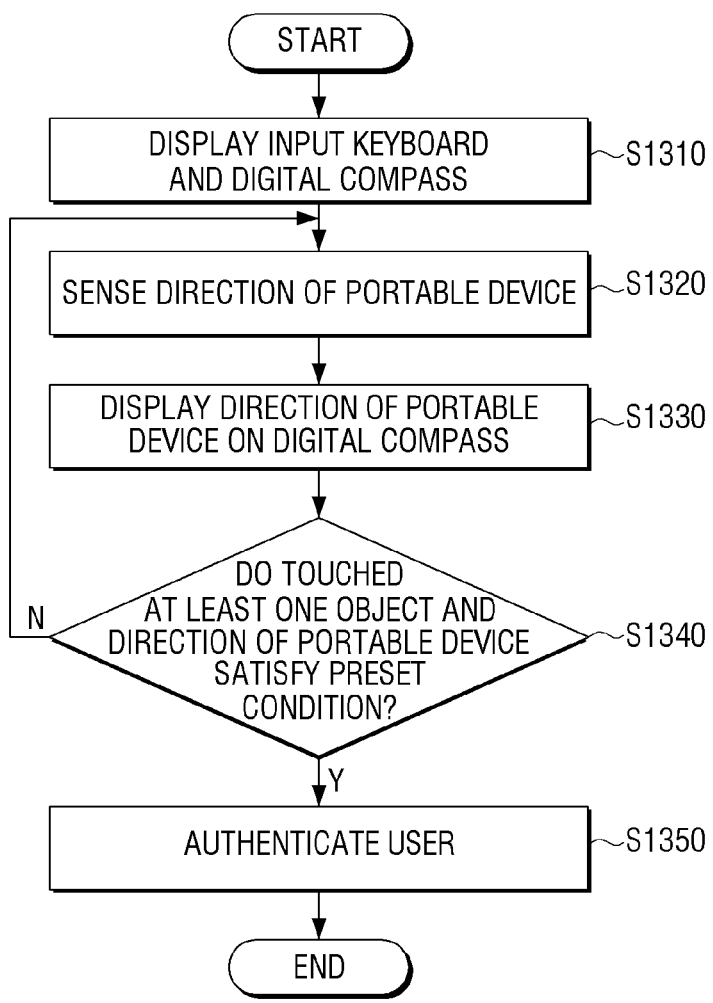

FIG. 13 is a flowchart illustrating a method of authenticating a password by using a touched object and a direction of a portable device according to an exemplary embodiment. In other words, the authentication method uses the physical orientation of the device at the time of symbol selection to provide the direction information in a sequence of selected symbol indications with respective direction information, and this is compared to a previously set authentication sequence.

In operation S1310, the portable device 100 displays an input keyboard on which a plurality of different objects are arranged, together with a digital compass. Here, the plurality of different objects may be sequentially or randomly arranged on the input keyboard.

In operation S1320, the portable device 100 senses a direction thereof by using the sensor 120.

If the direction of the portable device 100 is sensed, the portable device 100 displays the sensed direction on the digital compass in operation S1330.

In operation S1340, the portable device 100 determines whether at least one touched object and the direction of the portable device 100 satisfies a preset condition. Here, the preset condition is a condition for authenticating a password. For example, according to the preset condition, keys corresponding to numbers 9 and 1 may be touched, and the direction of the portable device 100 may be north (N).

If it is determined in operation S1340 that the at least one touched object and the direction of the portable device 100 satisfy the preset condition, the portable device 100 authenticates a user in operation S1350.

In other words, in FIG. 13, a plurality of authentication interaction symbols are displayed in an arrangement which may be random, in S1310. In S1320 and S1330, one or more input signals are detected, with respect to the displayed authentication interaction symbols, and respective direction information is also detected, to obtain a sequence of selected symbol indications with respective direction information. In S1340, the sequence of selected symbol indications with respective direction information is compared with the previously set authentication sequence. If there is a match, processing continues with S1350, in which the device is determined to have been placed into an authenticated state.

Figure 14:
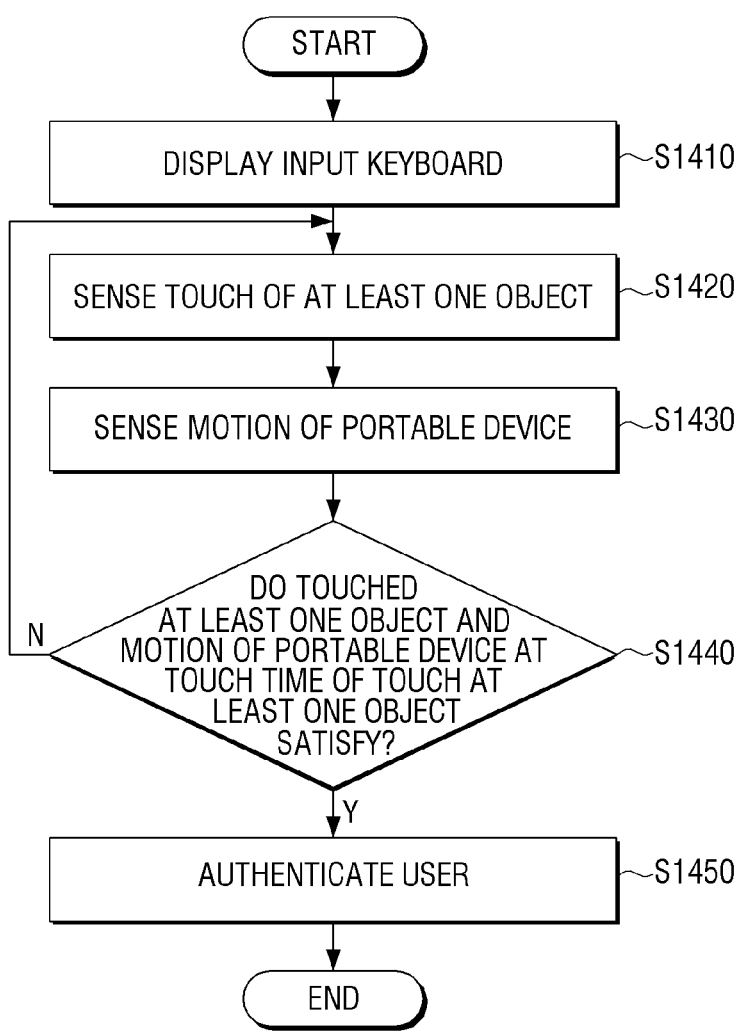

FIG. 14 is a flowchart illustrating a method of authenticating a password by using a touched object and a motion of a portable device according to an exemplary embodiment. This may also be referred to as using a sequence of selected symbol indications with respective direction information, where the direction information indicates a physical motion of the device, such as a shake or a rotation motion, at the time of symbol selection.

In operation S1410, the portable device 1410 displays an input keyboard on which a plurality of different objects are arranged. Here, the plurality of different objects may be sequentially or randomly arranged on the input keyboard.

In operation S1420, the portable device 100 senses a touch of at least one object.

In operation S1430, the portable device 100 senses a motion thereof with respect to the at least one object touched, by using the sensor 120.

In operation S1440, the portable device 100 determines whether the at least one touched object and the motion of the portable device 100 at the time of the touch applied to the at least one object satisfy a preset condition. Here, the preset condition is a condition for authenticating a password. For example, when a key corresponding to number 3 is touched, a shake motion may be sensed. When a key corresponding to number 1 is touched, a rotation motion may be sensed.

If it is determined in operation S1440 that the touched at least one object and the motion of the portable device 100 at the touch time of the touched at least one object satisfy the preset condition, the portable device 100 authenticates a user in operation S1450. In other words, when the sequence of selected symbol indications with respective direction information, that indicates a physical motion of device at the time of symbol selection, matches the previously set authentication sequence, the device is determined to have been placed into an authenticated state.

According to the above-described various exemplary embodiments, it is difficult to trace a password, and thus security is improved. Therefore, the protection of personal information of a user may be strengthened.

According to another exemplary embodiment, a password that grants access to functions within the portable device 100 may have been given, and the device may be deemed to be in an authenticated state with respect to the user. When such a user wants to access an external server 1500, however, the user may be required to authenticate himself to the server before processes that are available on the server are made available to the user (i.e., processes such as once related to electronic banking or electronic commerce).

In detail, as shown in FIG. 15, the portable device 100 may request the external server 1500 to authenticate a password thereof in order to perform e-commerce, e-Banking, etc. The portable device 100 may encrypt input information (e.g., touched object information, direction information of the portable device 100, motion information of the portable device 100, etc.) of a user as described with reference to FIGS. 2A through 9D and transmit the encrypted input information to the external server 1500 through the communicator 140. The external server 1500 may analyze the input information of the user transmitted from the portable device 100 to authenticate the password of the user that must be presented to carry out the functions on the server 1500.

The authentication approaches and methods as described with respect to FIGS. 2A through 9D may also be applied to a TV remote controller.

Figure 16:
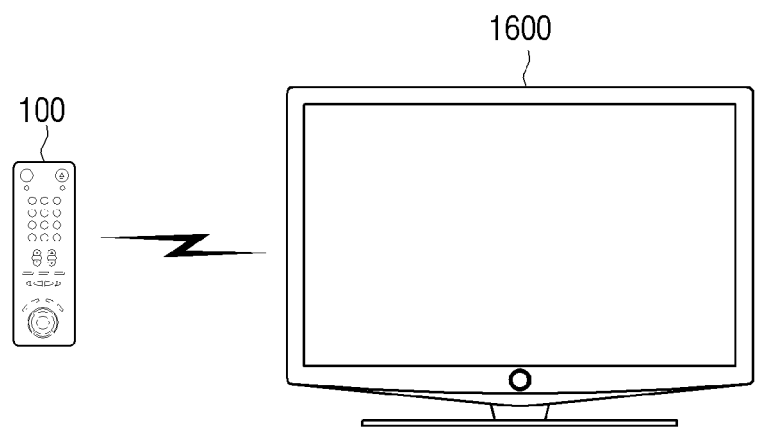

In detail, as shown in FIG. 16, a TV remote controller 100 may request a TV 1600 to authenticate a password thereof in order to control the TV 1600 or carry out other functions via the TV. As described with reference to FIGS. 2A through 9D, the TV remote controller 100 may encrypt user input information (e.g., touched object information, direction information of the TV remote controller 100, motion information of the TV remote controller 100, etc.) and transmit the encrypted user input information to the TV 1600 through the communicator 140. The TV 1600 may analyze the user input information transmitted from the TV remote controller 100 to authenticate the password.

According to another exemplary embodiment, a password of the TV remote controller 100 may also be authenticated to operate the TV remote controller 100.

In the above examples, as is well understood, it is possible to implement an upper limit on the number of attempts allowed to be made prior to requiring the user to start over or to be locked out.

A program code for executing password authenticating methods according to the above-described exemplary embodiments may be stored on various types of recording media. In detail, the program code may be stored on various types of computer-readable recording media, including a random-access memory (RAM), a flash memory, a read-only memory (ROM), an Erasable Programmable ROM (EPROM), an Electronically Erasable and Programmable ROM (EEPROM), a register, a hard disk, a removable disk, a memory card, a universal serial bus (USB) memory, a CD-ROM, etc. the foregoing may be understood to be examples of non-transitory computer readable media.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, combinations, sub-combinations, and variations will be apparent to those skilled in the art.

What is claimed is:

1. A method of authenticating a password of a portable device comprising a touch screen, the method comprising:
   displaying an input keyboard on which a plurality of objects regarding numbers which belong to the password are arranged in a matrix;
   changing arrangements of at least some of the plurality of objects arranged in a designated position or changing at least one of the plurality of objects arranged in the designated position to another one of the plurality of objects according to a manipulation of a user; and authenticating the user if an object of a pattern arranged in the designated position of the input keyboard corresponds to an object of a preset password pattern, wherein the pattern and the preset password pattern are a figure pattern, and wherein the changing comprises changing the arrangements of the at least some of the plurality of objects without modifying a shape of the matrix.

2. The method as claimed in claim 1, wherein the changing the arrangements of the plurality of objects is carried out so that when a first object of the plurality of objects is dragged to a position in which a second object of the plurality of objects is displayed, the position of the first object and second object are interchanged.

3. The method as claimed in claim 1, wherein the changing the arrangements of the plurality of objects is carried out so that when a first object of the plurality of objects is touched and then a second object of the plurality of objects is touched, the positions of the first object and the second object are interchanged with each other.

4. The method as claimed in claim 1, wherein:
the changing the arrangements of the plurality of objects is carried out so that:
when a first object of the plurality of objects is selected, and upward and/or downward motions of the portable device are sensed, positions of the objects in the column that has the first object are changed in an upward and/or downward direction; and
when the first object of the plurality of objects is touched, and left and/or right motions of the portable device are sensed, the positions of the objects in the row that has the first object are changed in a left and/or right direction.

5. The method as claimed in claim 1, wherein:
the changing the arrangements of the plurality of objects is carried out so that:
when a first object of the plurality of objects is dragged upwards and/or downwards, the positions of the objects in the column that has the first object are changed in an upward and/or downward direction; and
when the first object of the plurality of objects is dragged in left and/or right directions, the positions of the objects in the row that has the first object are changed in a left and/or right direction.

6. The method as claimed in claim 1, wherein:
the changing the arrangements of objects is carried out by:
selecting a first number arranged on the input keyboard;
when the portable device is inclined, selecting one of four fundamental arithmetic operations corresponding to a preset incline direction in which the portable device is inclined;
selecting a second number arranged on the input keyboard; and
using the one of the four fundamental arithmetic operations that corresponds to the preset incline direction, and the first and second numbers, to change the first number to another number, according to a calculation result.

7. The method as claimed in claim 6, wherein, when the calculation result exceeds 9, the first number is changed to a one-digit number of the calculation result.

8. The method as claimed in claim 1, wherein, when the objects arranged on the input keyboard are numbers, the plurality of numbers are randomly arranged and displayed on the input keyboard.

9. The method as claimed in claim 1, wherein a selected object is displayed in a manner distinct from non-selected objects.

10. A portable device for authenticating a password, the portable device comprising:
a touch screen which displays an input keyboard on which a plurality of objects regarding numbers which belong to the password are arranged in a matrix; and
a controller which changes arrangements of at least one of the plurality of objects arranged in a designated position to another one of the plurality of objects according to a manipulation of a user, and authenticates the user if an object of a pattern arranged in the designated position of the input keyboard corresponds to an object of a preset password pattern,
wherein the pattern and the preset password pattern are a figure pattern, and
wherein the controller is further configured to change the arrangements of the at least some of the plurality of objects without modifying a shape of the matrix.

11. The portable device as claimed in claim 10, wherein when a first object of the plurality of objects is dragged to a position in which a second object of the plurality of objects is displayed, the controller interchanges the positions of the first object and the second object.

12. The portable device as claimed in claim 10, wherein a first object of the plurality of objects is touched, and then a second object of the plurality of objects is touched, the positions of the first object and the second object are interchanged.

13. The portable device as claimed in claim 10, wherein:
when a first object of the plurality of objects is selected, and upward and/or downward motions of the portable device are sensed, the controller changes the positions of the objects in the column that has the first object in an upward and/or downward direction; and
when the first object of the plurality of objects is selected, and left and/or right motions of the portable device are sensed, the controller changes the positions of the objects in the row that has the first object in a left and/or right direction.

14. The portable device as claimed in claim 10, wherein:
when a first object of the plurality of objects is dragged upwards and/or downwards, the controller changes the positions of the objects in the column having the first object in an upward and/or downward direction; and
when the first object of the plurality of objects is dragged in left and/or right directions, the controller changes the positions of the objects in the row having the first object in a left and/or right direction.

15. The portable device as claimed in claim 10, wherein:
the controller changes the arrangements of the plurality of objects by:
detecting a selection of a first number arranged on the input keyboard;
detecting a direction of inclination of the portable device;
selecting, based on the direction of inclination, one of four fundamental mathematical operations previously defined as corresponding to the detected direction of inclination;
detecting a selection of a second number arranged on the input keyboard;
calculating a calculation result based on the first number and the second number, using the selected one of the four fundamental operations; and changing the first number according to the calculation result.

16. The portable device as claimed in claim 15, wherein when the calculation result exceeds 9, the first is changed to a one-digit number of the calculation result.

17. The portable device as claimed in claim 10, wherein, when the objects displayed on the input keyboard are numbers, the plurality of numbers are randomly arranged and displayed on the input keyboard.

18. The portable device as claimed in claim 10, wherein a selected object is displayed in a manner distinct from non-selected objects.

19. The portable device as claimed in claim 10, further comprising a communicator which communicates with an external server, wherein the controller controls the communicator to transmit object pattern information, based on a present one of the one or more subsequent patterns of the plurality of objects, to the external server.

20. A method of authenticating a password of a portable device comprising a touch screen, the method comprising:
   displaying an input keyboard on which a plurality of objects regarding numbers which belong to the password are arranged in a matrix;
   when one or more objects of the plurality of objects are dragged in respective directions, comparing the dragged one or more objects and respective directions of dragging to a previously set sequence of one or more objects and dragging directions; and
   when the dragged one or more objects and respective directions of dragging match the previously set sequence, determining the user to be authenticated,
   wherein a shape of the matrix is not modified by the dragging.

21. A portable device for authenticating a password, the portable device comprising:
   a touch screen which displays an input keyboard on which a plurality of objects regarding numbers which belong to the password are arranged in a matrix; and
   a controller which, when one or more of the plurality of objects are dragged in respective directions, compares the dragged one or more objects and respective directions of dragging to a previously set sequence of one or more objects and dragging directions,
   wherein, when the dragged one or more objects and respective directions of dragging match the previously set sequence, the controller determines the user to be authenticated, and
   wherein a shape of the matrix is not modified by the dragging.

22. An authentication method for a device, comprising:
   displaying, on a display of the device, a plurality of authentication interaction symbols which belong to the password in an arrangement of a matrix;
   in response to an input signal, modifying the arrangement of the symbols in the designated position to display a subsequent arrangement of the symbols;
   when the subsequent arrangement of the symbols in the designated position matches a previously set authentication arrangement, determining the device to have an authenticated state,
   wherein the modifying the arrangement of the symbols comprises modifying the arrangement of the symbols without modifying a shape of the matrix.

23. An authentication method for a device, comprising:
   displaying, on a display of the device, a plurality of authentication interaction symbols which belong to the password in a random arrangement of a matrix;
   detecting one or more input signals, with respect to one or more selected ones of the plurality of authentication interaction symbols, and also respective direction information for the one or more input signals, to obtain a sequence of selected symbol indications with respective direction information; and
   when the sequence of selected symbol indications with respective direction information matches a previously set authentication sequence, determining the device to have an authenticated state,
   wherein a shape of the matrix is not modified by the authentication method.

* * * * *